(12) United States Patent
Tamaki

(10) Patent No.: US 8,761,041 B2
(45) Date of Patent: Jun. 24, 2014

(54) RADIO BASE STATION SYSTEM AND BASE STATION

(75) Inventor: Tsuyoshi Tamaki, Machida (JP)

(73) Assignee: Hitachi, Ltd., Tokyo (JP)

( * ) Notice: Subject to any disclaimer, the term of this patent is extended or adjusted under 35 U.S.C. 154(b) by 85 days.

(21) Appl. No.: 13/208,049

(22) Filed: Aug. 11, 2011

(65) Prior Publication Data

US 2012/0051260 A1 Mar. 1, 2012

(30) Foreign Application Priority Data

Sep. 1, 2010 (JP) ................................ 2010-195286

(51) Int. Cl.
*H04L 12/26* (2006.01)

(52) U.S. Cl.
USPC .......................................................... 370/253

(58) Field of Classification Search
None
See application file for complete search history.

(56) References Cited

U.S. PATENT DOCUMENTS

| | | | |
|---|---|---|---|
| 2010/0039974 A1 | 2/2010 | Toshimitsu et al. | |
| 2010/0151852 A1 | 6/2010 | Mori et al. | |
| 2010/0246534 A1* | 9/2010 | Vargantwar et al. | 370/331 |
| 2010/0265919 A1* | 10/2010 | Ma et al. | 370/332 |
| 2011/0070881 A1* | 3/2011 | Hwang et al. | 455/423 |
| 2011/0116476 A1* | 5/2011 | Lee et al. | 370/331 |
| 2011/0287768 A1* | 11/2011 | Takamatsu et al. | 455/444 |

FOREIGN PATENT DOCUMENTS

| | | |
|---|---|---|
| JP | 2000-175243 A | 6/2000 |
| JP | 2003-037555 A | 2/2003 |
| JP | 2009-159355 | 7/2009 |
| JP | 2010-004438 | 1/2010 |
| JP | 2010-045561 A | 2/2010 |
| WO | WO 2008-136416 A1 | 11/2008 |

* cited by examiner

*Primary Examiner* — Dang Ton
*Assistant Examiner* — Ronald H Davis
(74) *Attorney, Agent, or Firm* — Foley & Lardner LLP

(57) ABSTRACT

A femto base station registers IDs of neighboring macro base stations and the ID of a terminal into a management device. When the femto base station detects that the communication state of a terminal in communication with the femto base station transited from active to idle, the femto base station hands off the communication session to one of the neighboring macro stations and enters the dormant state. When the macro base station detects that the communication state of the terminal transited from idle to active, the macro base station transmits an inquiry to the management device, identifies a femto base station to be started based on the terminal ID and the macro base station ID and starts the femto base station. When the femto base station is started, it is handed off from the macro base station to the femto base station to maintain the communication session of the terminal.

13 Claims, 23 Drawing Sheets

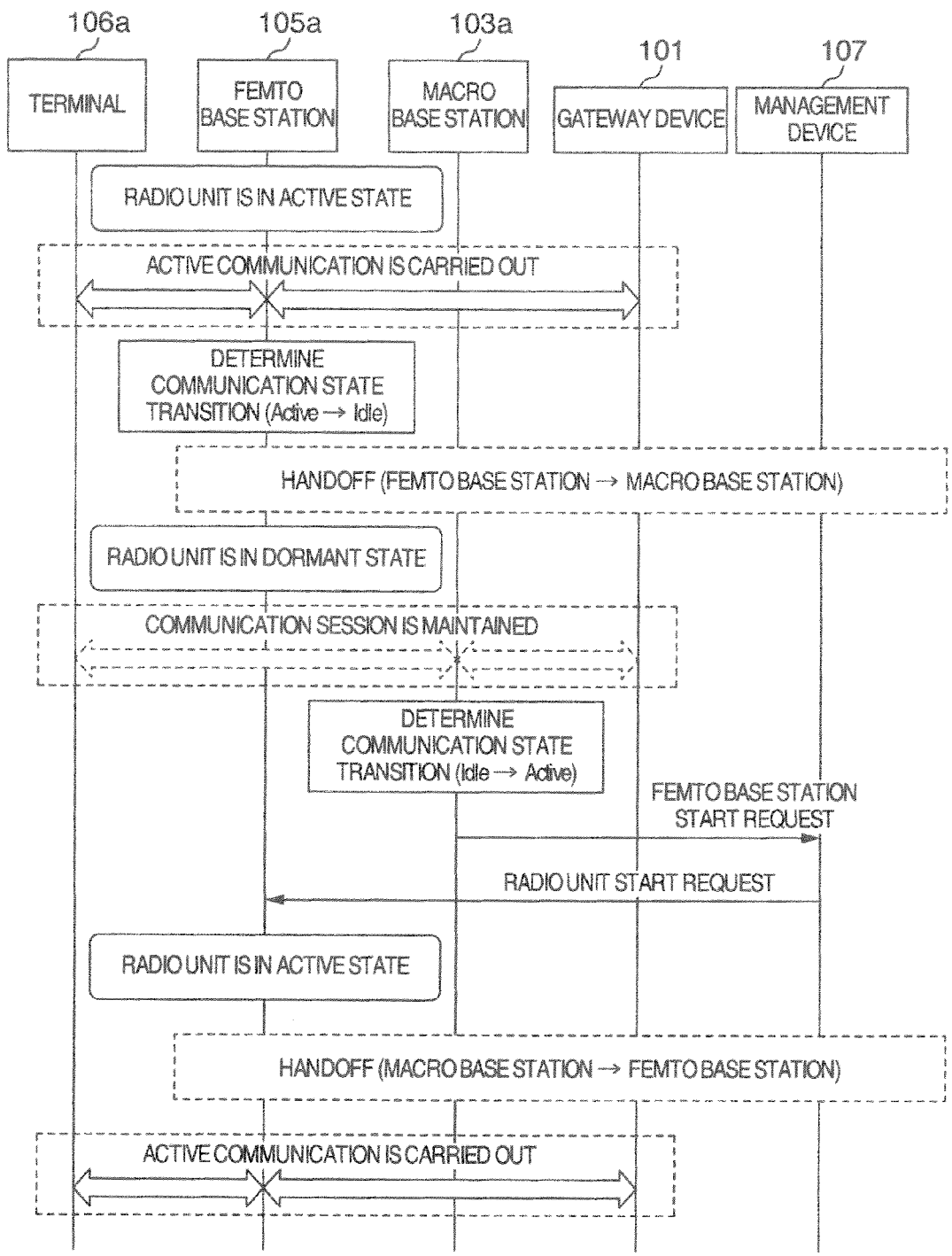

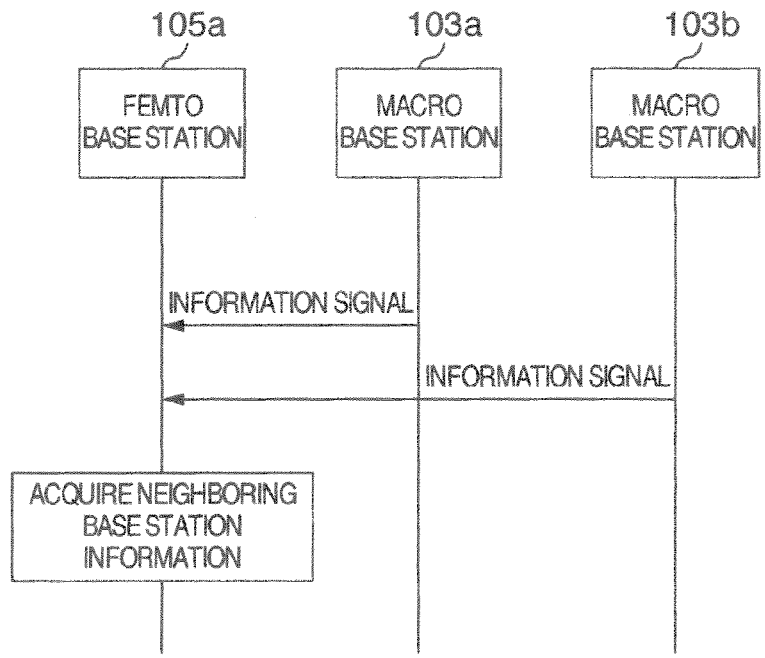

SEQUENCE IN WHICH TERMINAL
ACQUIRES NEIGHBORING BASE STATION INFORMATION

NEIGHBORING BASE STATION INFORMATION STORED IN TERMINAL

| NEIGHBORING BASE STATION ID | NEIGHBORING BASE STATION SECTOR ID | AVERAGE RECEIVED POWER | LAST UPDATE TIME |
|---|---|---|---|
| 10001 | 1 | -63 dBm | 10:30:01 |
| 10003 | 3 | -78 dBm | 10:38:34 |
| 10002 | 2 | -89 dBm | 8:38:34 |
| 2001 | 1 | -55 dBm | 10:38:34 |

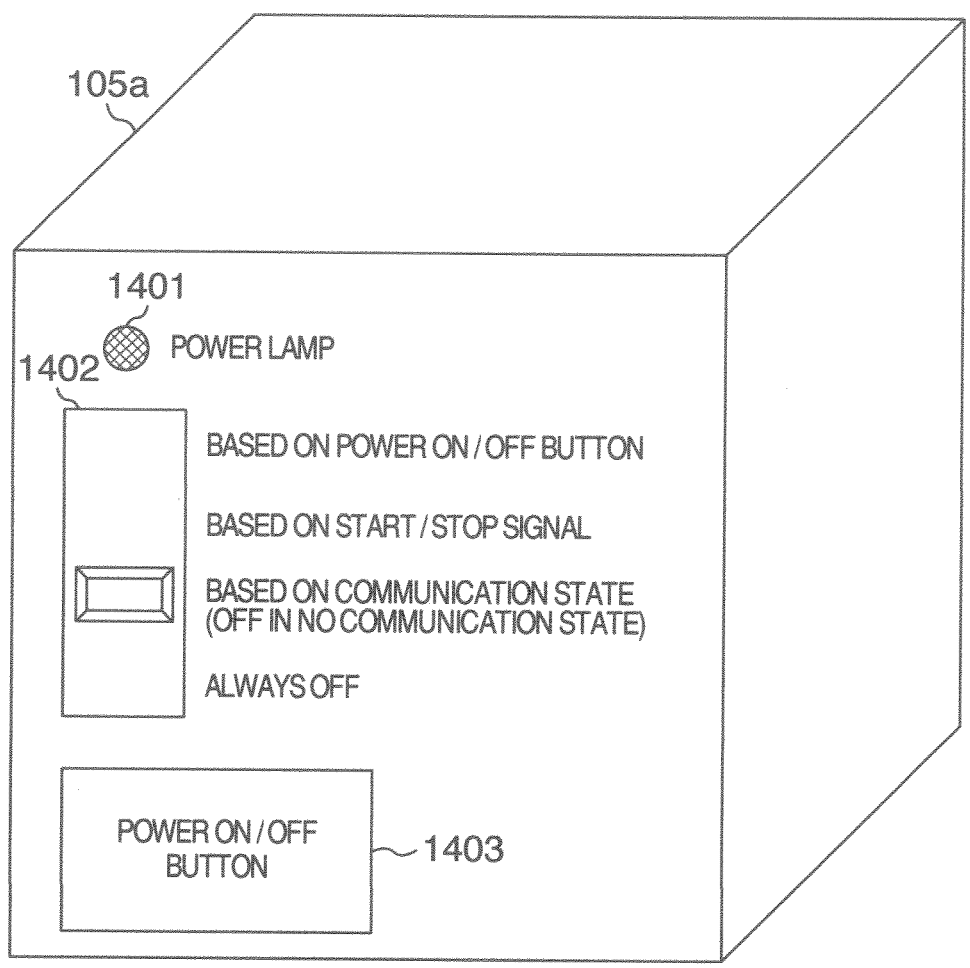

FIG.15B

POWER BUTTON MODE SETTING AND OPERATION

| SETTING | OFF→ON | ON→OFF |
|---|---|---|
| ON/OFF IS DETERMINED BY POWER ON/OFF BUTTON | POWER OF ENTIRE DEVICE IS TURNED ON WHEN BUTTON IS PRESSED | POWER OF ENTIRE DEVICE IS TURNED OFF WHEN BUTTON IS PRESSED |
| ON/OFF IS DETERMINED BY START/STOP SIGNAL | POWER IS TURNED ON WHEN START SIGNAL IS DETECTED OR BUTTON IS PRESSED | STANDBY STATE IS ENTERED WHEN STOP SIGNAL IS DETECTED OR BUTTON IS PRESSED |
| ON/OFF IS DETERMINED BY COMMUNICATION STATE (OFF IN NO COMMUNICATION STATE) | POWER IS TURNED ON WHEN START SIGNAL IS DETECTED OR BUTTON IS PRESSED | POWER OF RADIO UNIT IS TURNED OFF WHEN COMMUNICATION STATE IS Idle/Null STATE OR BUTTON IS PRESSED |
| ALWAYS OFF | POWER IS ALWAYS OFF | POWER IS ALWAYS OFF |

START / STOP TIME LOG OF FEMTO BASE STATION

| DATE | START TIME | STOP TIME |
|---|---|---|
| 2010.03.01(MONDAY) | 10:30 | 10:38 |
| 2010.03.01(MONDAY) | 21:40 | 23:30 |
| . . . | . . . | . . . |

START / STOP TIME INFORMATION ON FEMTO BASE STATION

| DAY OF WEEK | STOP TIME ZONE | AVERAGE TIME FROM STOP TO START |
|---|---|---|
| MONDAY | 5:00-12:00 | 100 MINUTES |
| MONDAY | 12:00-18:00 | 360 MINUTES |
| MONDAY | 18:00-26:00 | 30 MINUTES |
| TUESDAY | 26:00-5:00 | 360 MINUTES |
| . . . | . . . | . . . |
| SATURDAY | 18:00-26:00 | 4 MINUTES |
| . . . | . . . | . . . |
| SUNDAY | 26:00-5:00 | 100 MINUTES |

FIG.17

OPERATION OF POWER CONTROL UNIT OF FEMTO BASE STATION

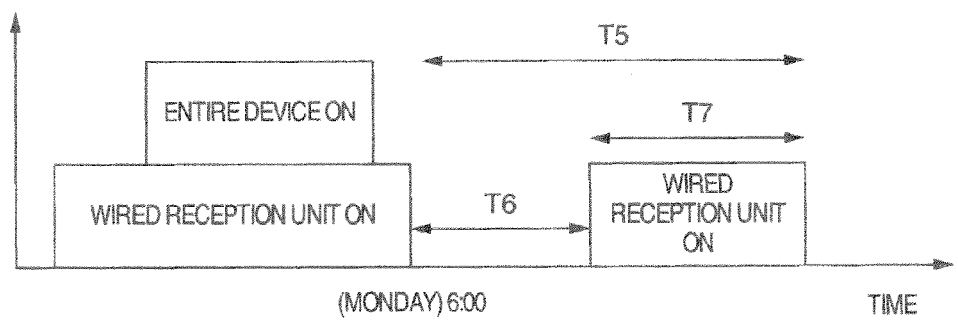

(MONDAY) 6:00

| DAY OF WEEK | STOP TIME ZONE | T5: AVERAGE TIME FROM STOP TO START | T6: WIRED RECEPTION UNIT IS STOPPED | T7: WIRED RECEPTION UNIT ON TIME |
|---|---|---|---|---|
| MONDAY | 5:00-12:00 | 100 MINUTES | 90 MINUTES | 5 MINUTES |
| MONDAY | 12:00-18:00 | 360 MINUTES | 350 MINUTES | 10 MINUTES |
| MONDAY | 18:00-26:00 | 30 MINUTES | 20 MINUTES | 10 MINUTES |
| TUESDAY | 26:00-5:00 | 360 MINUTES | 350 MINUTES | 30 MINUTES |
| ... | ... | ... | ... | |
| SATURDAY | 18:00-26:00 | 4 MINUTES | 2 MINUTES | 3 MINUTES |
| ... | ... | ... | ... | |
| SUNDAY | 26:00-5:00 | 100 MINUTES | 98 MINUTES | 5 MINUTES |

FIG.20

TERMINAL ID / FEMTO BASE STATION ID INFORMATION STORED IN MANAGEMENT DEVICE

| TERMINAL ID | FEMTO BASE STATION ID | LAST UPDATE TIME |
|---|---|---|
| 30001 | 20001 | 10:31:01 |
| 30002 | 20001 | 10:39:40 |
| 30005 | 20004 | 8:39:40 |
| . . . | . . . | . . . |

RADIO BASE STATION SYSTEM AND BASE STATION

INCORPORATION BY REFERENCE

The present application claims priority from Japanese application JP2010-195286 filed on Sep. 1, 2010, the content of which is hereby incorporated by reference into this application.

BACKGROUND OF THE INVENTION

1. Field of the Invention

The present invention relates to a power-saving radio communication system and a base station for use in the radio communication field.

2. Description of the Related Art

In the radio communication system where many communication devices such as mobile phones are used, the Personal Digital Cellular (PDC) communication in the second generation is based on voice applications. Beginning with the Code Division Multiple Access (CDMA) method and the Wideband CDMA (W-CDMA) method in the third generation, the data communication evolves into the mobile Internet access data communication. In addition, the commercial services have begun where the Evolution Data Only (EV-DO) method or the High Speed Downlink Packet Access (HSDPA) method, designed specifically for data communications, are used. There is an increasing need for high-speed communications in a radio communication system, with the high-speed radio infrastructure being built using the next-generation high-speed radio methods such as Long Term Evolution (LTE) and Worldwide Interoperability for Microwave Access (WiMAX).

In the conventional mobile phone system, the macro cell method is used where one base station covers a large area. Commercial services are beginning to be offered that combines the macro cell method with the femtocell method in which a base station is installed to cover the area of one building to improve the radio environment in the building where the radio wave from a macro cell is difficult to reach. Recent advances in the broadband technology allow high-speed communication lines, such as Fiber to the Home (FTTH) lines and Asymmetric Digital Subscriber Line (ADSL) lines, to be widely used, introducing the high-speed communication environment into the home. The introduction of such high-speed access line infrastructure begins to draw attention to the femtocell base station service that uses high-speed access lines.

A macro base station, which accommodates multiple terminals at the same time, performs operations with the power constantly on. On the other hand, a femtocell base station, which covers a small area sometimes with no terminal in the area, does not have to keep the power constantly on. Therefore, when a femtocell base station is installed in a home, power saving is required to reduce the electricity expense.

The well-known power saving technology is the intermittent reception operation employed by a terminal. This technology reduces the power consumption by intermittently removing the power for a fixed period during the reception. However, a femto base station, which serves as a base station that must respond to random access from the terminals, cannot use the intermittent reception operation. In addition, a femto base station must regularly transmit the information signal to notify the terminals of the presence of the femto base station.

JP-A-2010-004438 discloses the technology in which, with the transmission of the electric wave stopped, the radio communication transmission/reception unit receives the electric wave from a radio communication terminal and, after determining from the received electric wave signal that the radio communication terminal that has transmitted the electric wave is an authorized terminal, starts the transmission of the electric wave.

JP-A-2009-159355 discloses the technology in which a neighboring base station or a macro base station, which finds that there is a terminal in its cell, notifies the femto base station of the presence of the terminal to cause the femto base station to start the transmission.

SUMMARY OF THE INVENTION

According to the technology disclosed in JP-A-2010-004438, the radio transmission unit of a femto base station may be stopped for power saving while the radio reception unit cannot be stopped but must be in the active state to wait for and receive the signal from terminals. According to the technology disclosed in JP-A-2009-159355, both the radio transmission unit and the radio reception unit may be stopped when there is no terminal in the cell of a neighboring base station or a macro base station; however, the femto base station is in the active state even when there is a terminal in the cell of a neighboring base station or a macro base station but the terminal does not enter the range of the femto base station. In addition, while there is a terminal in the range of the femto base station, both the radio transmission unit and the radio reception unit must be in the active state.

A terminal is in one of the following three states: null state in which no call is made and no communication is carried out, active state in which, after a call is made and a communication session is established, the user is carrying out communication explicitly, and idle state in which the user does not carry out communication explicitly for a predetermined period of time. To allow communication to be carried out immediately after the terminal is changed from the idle state to the active state, the system must maintain the communication session even if the terminal is in the idle state. To maintain the communication session, the base station regularly transmits a packet to the terminal and receives the response packet from the terminal. Therefore, even if the terminal is in the idle state, the base station must stay in the active state to transmit and receive packets for maintaining the communication session.

In view of the foregoing, it is an object of the present invention to provide a femto base station that is started only when a terminal is in the range of the femto base station and, at the same time, stops not only the radio transmission unit but also the radio reception unit for power saving while maintaining the communication session even if the terminal is in the idle state in which the user intentionally does not carry out communication.

In the present invention, a radio communication system includes a first base station, a second base station that is in a radio wave reachable range of the first base station and has a radio wave reachable range shorter than the radio wave reachable range of the first base station, and a management device that manages the first base station and the second base station. The radio communication system includes a unit that detects that there is a terminal in the radio wave reachable range of the second base station, a unit that measures a received power of the first base station; a unit that notifies an ID of the first base station to the management device if the received power from the first base station is equal to or higher than a predetermined value; a unit that extracts an ID of the terminal in communication; a unit that notifies the extracted terminal ID to the management device; a unit that detects an amount of communication traffic between the terminal and the first base station or second base station; a unit that determines if the amount of communication traffic is larger than a predetermined value; and a unit that hands off a communication session between the second base station and the terminal to the first base station. If the amount of communication traffic of the terminal in communication with the second base station is smaller than the predetermined value, the second base station hands off the communication session to the first base station.

According to the present invention, when the femto base station detects that the communication state of a terminal transits from active to idle, the communication session of the femto base station is handed off to a macro base station. This handoff processing places the femto base station in the dormant state while maintaining the communication session of the terminal, thus saving power even if the terminal under control of the femto base station is in the communication idle state.

Other objects, features and advantages of the invention will become apparent from the following description of the embodiments of the invention taken in conjunction with the accompanying drawings.

BRIEF DESCRIPTION OF THE DRAWINGS

FIG. 3 is a diagram showing the general operation sequence in the embodiment of the present invention.

FIG. 4A is a diagram showing the control sequence in which a femto base station collects neighboring base station information.

FIG. 4B is a diagram showing the neighboring base station information stored in the femto base station.

FIG. 15A is a diagram showing the user interface of the power button on the femto base station in the embodiment of the present invention.

FIG. 15B is a diagram showing the power on/off operation performed according to the power button setting mode of the femto base station in the embodiment of the present invention.

FIG. 17 is a diagram showing the operation of the power control unit of the femto base station in the embodiment of the present invention.

FIG. 20 is a diagram showing the terminal ID/femto base station ID information stored in the management device in the embodiment of the present invention.

DETAILED DESCRIPTION OF THE EMBODIMENTS

Figure 1:
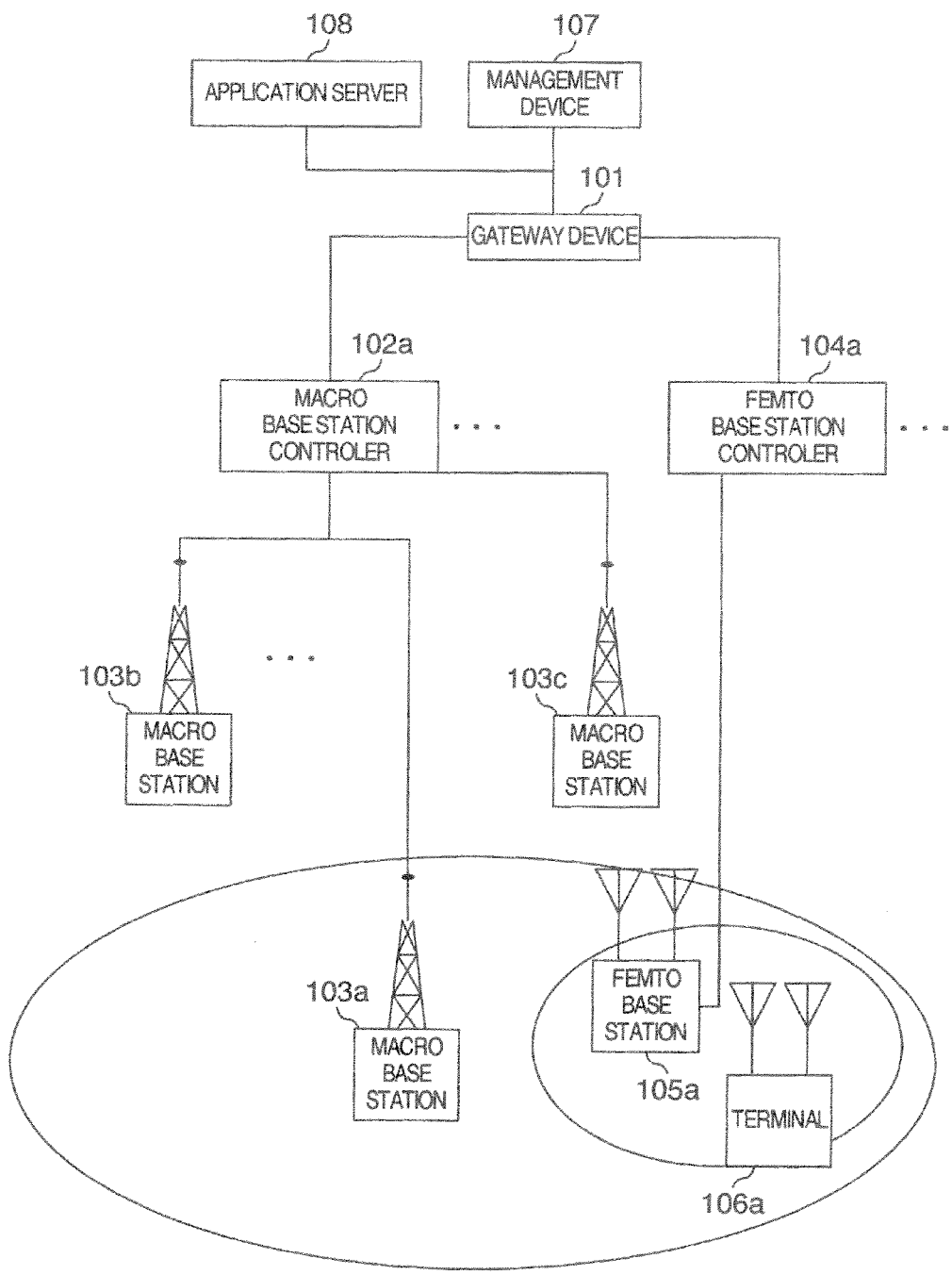
FIG. 1 is a diagram showing the general configuration of a radio system in an embodiment of the present invention.

A radio communication system in the present invention includes a first base station, a second base station that is in a radio wave reachable range of the first base station and has a radio wave reachable range shorter than the radio wave reachable range of the first base station, and a management device that manages the first base station and the second base station. The radio communication system includes a unit that detects that there is a terminal in the radio wave reachable range of the second base station; a unit that measures a received power of the first base station, a unit that notifies an ID of the first base station to the management device if the received power from the first base station is equal to or higher than a predetermined value; a unit that extracts an ID of the terminal in communication, a unit that notifies the extracted terminal ID to the management device; a unit that detects an amount of communication traffic between the terminal and the first base station or second base station, a unit that determines if the amount of communication traffic is larger than a predetermined value; and a unit that hands off a communication session between the second base station and the terminal to the first base station wherein, if the amount of communication traffic of the terminal in communication with the second base station is smaller than the predetermined value, the second base station hands off the communication session to the first base station. More specifically, based on the received power of a neighboring macro base station corresponding to the first base station, the femto base station corresponding to the second base station first notifies the ID of a neighboring macro base station, from which the received power higher than a threshold is received, to the management device. When the terminal starts communication with the femto base station, the femto base station notifies the terminal ID and the femto base station ID to the management device. Next, when the femto base station detects that the communication state of the terminal in communication with the femto base station has transited from active to idle, the femto base station hands off the communication session to one of the neighboring macro stations and enters the dormant state. In the dormant state, the femto base station keeps supplying power only to the function block that detects the start signal that will be described later, and stops the power to other functional blocks. This allows the communication session of the terminal to be maintained by the communication via the macro base station even if the femto base station enters the dormant state.

After handing off the communication session to the first base station, the second base station does not perform radio transmission/reception to and from the terminal. The radio communication system further includes a unit that hands off a communication session between the first base station and the terminal to the second base station wherein, if the amount of communication traffic of the terminal in communication with the first base station is larger than the predetermined value, the first base station hands off the communication session to the second base station. There is a plurality of the first base stations and, when a communication session is handed off from the second base station to one of the plurality of first base stations, the second base station hands off the communication session to one of the plurality of first base stations from which the highest received power is received. More specifically, when the macro base station detects that the terminal communication state has transited from idle to active, the macro base station notifies the femto base station start request control message to the management device. This control message includes the ID of the terminal that has transited from idle to active. Based on the ID of the macro base station from which the femto base station start request control message was received, the management device extracts the candidate femto base stations registered in the macro base station and, based on the relation between the terminal ID and the femto base station ID, identifies the femto base station to be started. The management device transmits a special-format start signal to the identified femto base station to start the femto base station. The femto base station, in which only the functional block for detecting the special-format is started even in the dormant state, can be started by the start signal transmitted from the management device. When the femto base station is started, the communication session of the terminal is handed off from the macro base station to the femto base station to continue the communication via the femto base station. In this case, when the communication state of the terminal transits from idle to active, the femto base station that has been in the dormant state is started and the communication session is handed off from the macro base station to the femto base station. Therefore, the communication session that has been maintained by the macro base station is taken over to continue the communication. As a result, while the prior art technology requires the terminal to establish a communication session for the initial connection when the femto base station that has been in the dormant state is started, the configuration of the present invention allows the communication session to be taken over from the macro base station through the handoff operation, thus reducing the overhead time required until the communication session is established.

In addition, if after detecting that there are one or more terminals in the radio wave reachable range of the second base station, no terminal issues a call for a predetermined period of time or longer, the second base station stops the supply of power to the radio unit and does not perform radio communication with the terminal. More specifically, if the state continues in which no terminal is under control of the femto base station for a predetermined period of time or longer or if the state continues in which there are one or more terminals under control of the femto base station but no terminal initiates a call for a predetermined period of time or longer, the femto base station enters the dormant state.

Immediately before entering the dormant state, the ID of a macro base station, from which the femto base station receives the received power equal to or higher than a predetermined threshold, may be notified to the management device to update the information of the neighboring macro base stations on the femto base stations. In the dormant state, the supply of power to the functional block for detecting the start signal may be continued. The intermittent operation may also be repeated in which the supply of power to the functional block for detecting the start signal is continued for a predetermined period of time and, after that, the supply of power is stopped for a predetermined period of time.

After a handoff request is issued from the second base station and a path switching request is issued from the management device to a gateway device, the communication session is preferably handed off from the second base station to the first base station. By doing so, the femto base station is placed in the dormant state except when the terminal communication state is active, and the information signals that are regularly transmitted are suppressed and therefore the interference to the neighboring stations is reduced.

Next, the femto base station according to the present invention is a femto base station that is in a first radio wave reachable range of a macro base station and has a second radio wave reachable range shorter than the first radio wave reachable range. The femto base station includes a unit that detects that there is a terminal in the second radio wave reachable range; a unit that measures a received power of the macro base station; a unit that notifies an ID of the macro base station to a management device if the received power from the macro base station is equal to or higher than a predetermined value; a unit that extracts an ID of the terminal in communication; a unit that notifies the extracted terminal ID to the management device; a unit that detects an amount of communication traffic between the terminal and the macro base station or the femto base station; a unit that determines if the amount of communication traffic is larger than a predetermined value; and a unit that hand off a communication session between the femto base station and the terminal to the macro base station wherein, if the amount of communication traffic of the terminal in communication with the femto base station is smaller than the predetermined value, the femto base station hands off the communication session to the macro base station.

After handing off the communication session to the macro base station, the femto base station does not perform radio transmission/reception to and from the terminal. If the amount of communication traffic of the terminal in communication with the macro base station is larger than the predetermined value, the communication session is handed off from the macro base station.

In addition, there are a plurality of macro base stations and, if the amount of communication traffic of the terminal in communication with the femto base station is smaller than the predetermined value, the femto base station hands off the communication session to one of the plurality of macro base stations from which the highest received power is received.

If after detecting that there are one or more terminals in the radio wave reachable range of the femto base station, no terminal initiates a call for a predetermined period of time or longer, the femto base station does not perform radio communication with the terminal, and the power control unit stops the supply of power to the radio unit.

After a handoff request is issued and a path switching request is issued from the management device to a gateway device, the communication session is handed off from the femto base station to the macro base station. The femto base station further includes a wired interface and, when the supply of power to the radio unit is stopped, power is supplied to a start signal detection unit included in the wired interface for detecting a start signal supplied from an external source and, when the start signal detection unit detects the start signal from the external source, the supply of power to the radio unit and the wired interface is resumed.

The general configuration of a radio system in an embodiment of the present invention will be described with reference to FIG. 1. A terminal 106a is in communication with an application server 108. A gateway device 101 has the function to switch the communication path to the terminal between via a macro base station controller 102a and via a femto base station controller 104a. The example in FIG. 1 indicates that the terminal 106a is in an area in which the terminal 106a can connect to both a macro base station 103a and a femto base station 105a. The radio communication method between the terminal 106a and the macro base station 103a may be different from the radio communication method between the terminal 106a and the femto base station 105a.

The macro base station controller 10a, with multiple macro base stations (103a, 103b, 103c, and so on) below it, performs processing for the terminal 106a to establish a communication session with the macro base station 103a. The macro base station 103a refers to a base station that covers a large area while the femto base station 105a refers to a base station that covers an area smaller than that of the macro base station. Therefore, the relation between a macro base station and a pico base station or the relation between the femto base station and a pico base station is distinguished also by whether the area covered by one base station is larger or smaller than the area covered by the other.

Similarly, femto base station controller 104a, with multiple femto base stations (105a and so on) below it, performs processing to establish a communication session. The following describes the communication state of a terminal, which will be used in the description below, with reference to FIG. 2A and FIG. 2B.

Figure 2A:
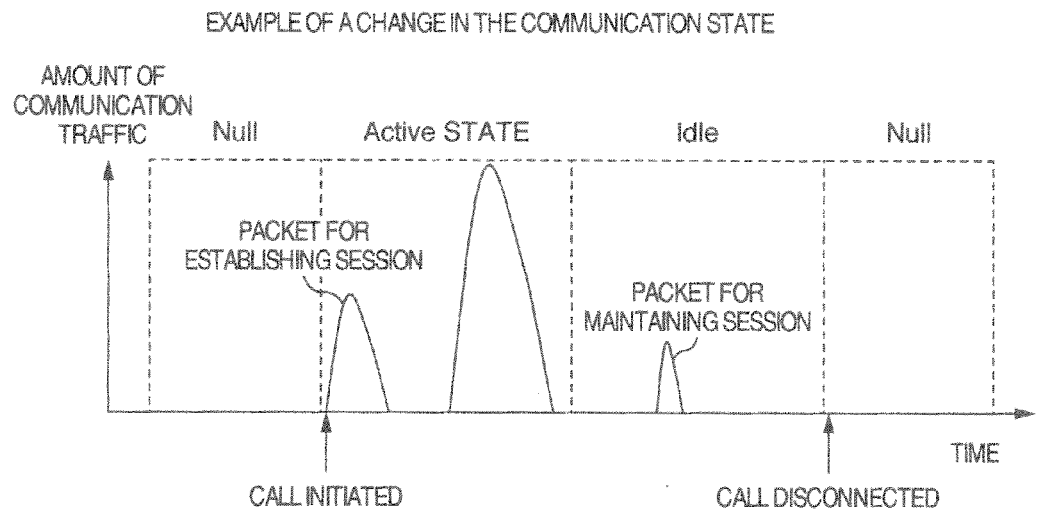
FIG. 2A is a diagram showing an example of a change in the communication status of a terminal.

FIG. 2A is a diagram showing an example of a change in the communication state of a terminal. When the power of the terminal 106a is off, the terminal 106a is not recognized in a radio communication system and this state is defined as the null state. When the power is turned on, the location registration processing is performed to make the terminal belong to one of the base stations. Even after the location registration is terminated, the terminal is still in the null state. When the terminal performs the processing for starting communication (makes a call), the communication session is established. The state in which data communication is carried out with the communication session established is defined as the active state. When a predetermined time period has elapsed, the state continues in which no explicit data communication is carried out and, in this communication state, only the packets for maintaining the communication session are transmitted. This state is defined as the idle state. When the user disconnects the call, the terminal transits to the null state.

Figure 2B:
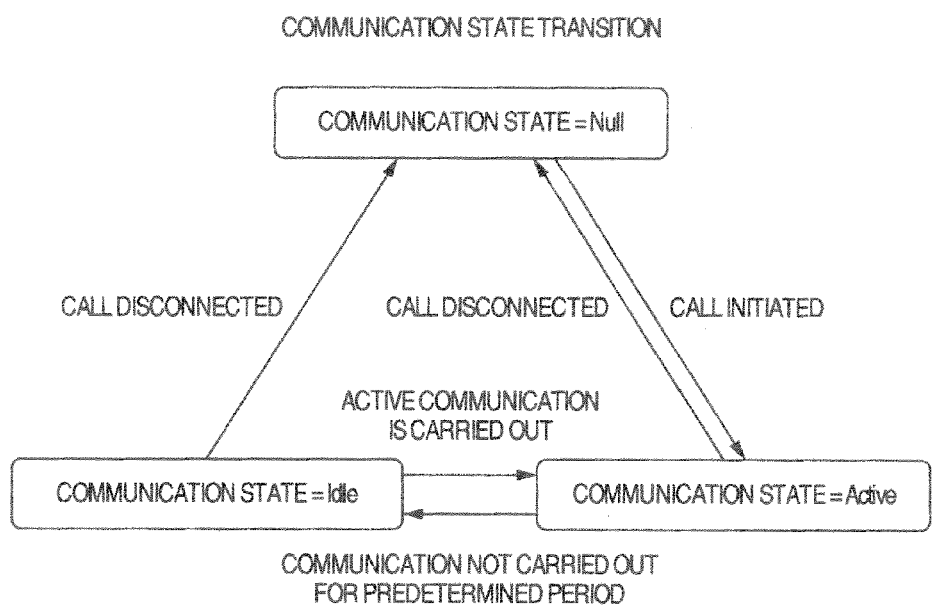
FIG. 2B is a diagram showing the communication state transition of a terminal.

FIG. 2B is a diagram showing the communication state transition of a terminal. When a call is issued in the null state, the terminal transits to the active state. The terminal transits from the active state to the idle state when communication is carried out only to maintain the communication session, while the terminal transits from the idle state to the active state when the terminal starts the data communication. The terminal transits to the null state when the terminal disconnects the call in the active state or null state.

The following describes the outline of the operation sequence in the embodiment of the present invention with reference to FIG. 3. In the radio unit active state of the femto base station 105a, the terminal 106a carries out communication via the femto base station 105a according to the standard procedure. The femto base station 105a monitors the communication state of this terminal and, upon detecting that the communication state has transited from the active state to the idle state, performs the handoff operation to place the communication session under control of the macro base station 103a. After that, the femto base station 105a enters the radio unit dormant state. Even when the terminal communication is in the idle state, the communication session is maintained via the macro base station 103a. After that, when the terminal 106a restarts the communication, the macro base station 103a transmits the femto base station start request control message to a management device 107. The management device identifies the femto base station 105a and transmits the radio unit start request control message to the femto base station 105a to start the radio unit. After that, the handoff from the macro base station 103a to the femto base station 105a is performed to place the communication session under control of the femto base station 105a.

The following describes the embodiment of the present invention in detail with reference to the drawings. FIG. 4A is a diagram showing the control sequence in which the femto base station in the embodiment of the present invention collects information on the neighboring base stations. The femto base station 105a receives the information signal transmitted regularly from the neighboring macro base stations 103a and 103b, measures the received power of the information signal, extracts the base station ID and sector ID included in the information signal, and accumulates the extracted information as the database of the information on the neighboring base stations. It is supposed a new database is created when the femto base station is started and, after that, the database is updated at regular intervals.

FIG. 4B is a diagram showing the neighboring base station information stored in the femto base station in the embodiment of the present invention. For example, the information in the figure indicates that the base station ID of the macro base station 103a is 10001 and the base station ID of the macro base station 103b is 10003. When the information signal is received from the macro base stations 103a and 103b for updating the database, the femto base station 105a updates the values of the received power of the neighboring base stations whose IDs are 10001 and 10003 and the timestamps of the last update times. Because the signal is not received from the neighboring base station with the ID 10002 in this example, the femto base station 105a does not update the timestamp. When updating the database, the femto base station 105*a* checks the difference between the last update time and the database update time and deletes the information elements for which no data update is made for a predetermined length of time or longer to keep the neighboring base station information up-to-date. Expression 1 given below may be used to calculate the average received power through moving average where, at the i-th database update, X(i) is the value of the received power measured when the information is received and Y(i) is the value of the average received power recorded in the database.

$$Y(i+1)=a \times X(i)+(1-a) \times Y(i) \qquad \text{(Expression 1)}$$

where a is the coefficient in the range 0 to 1. In another embodiment, the database may be updated with Y(i+1) as the simple average value of the received power values, X(i-n), . . . , X(i), received for a predetermined period.

Figures 5A, 5B:
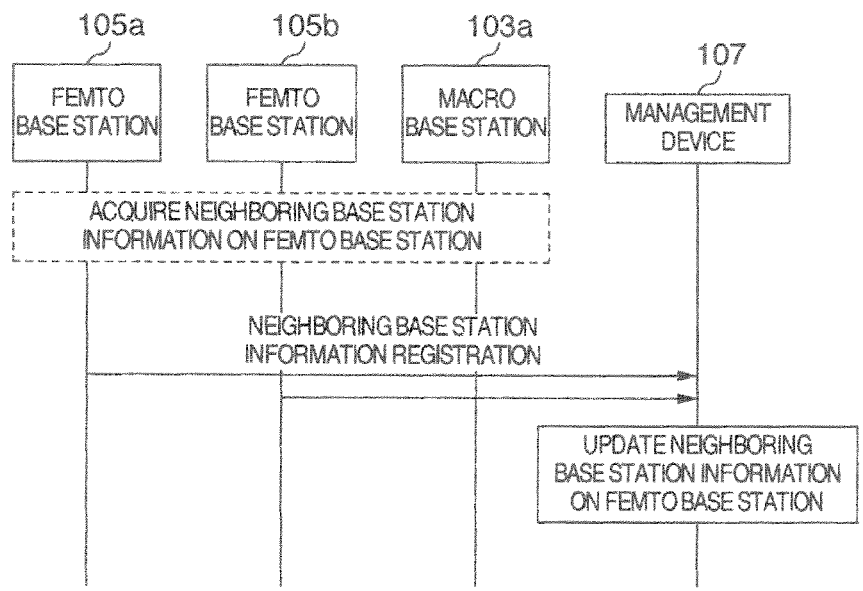
FIG. 5A is a diagram showing the control sequence in which a management device collects neighboring base station information on femto base stations.
FIG. 5B is a diagram showing the neighboring base station information on the femto base stations stored in the management device.

FIG. 5A is a diagram showing the sequence in which the management device acquires the neighboring base station information on the femto base stations. One or more ferrite base stations (105*a*, 105*b* and so on), which have collected the neighboring base station information shown in FIG. 4B, transmit the neighboring base station information registration control message to the management device 107. The control message includes the femto base station ID and all the information shown in FIG. 4B. This control message may be transmitted either when a predetermined periodic timer has timed out since the neighboring base station information is made available to the femto base stations 105*a*, 105*b*, and so on or when the neighboring base station information is updated N times (N is an integer equal to or larger than 1).

FIG. 5B is a diagram showing the neighboring base station information on the femto base stations stored in the management device. The management device 107 searches the database using the femto base station ID included in the control message as the index. If the femto base station ID is not found in the database, the management device 107 registers all the information, shown in FIG. 4B, as a new entry; if the femto base station ID is found in the database, the management device 107 updates all the information shown in FIG. 4B. In the embodiment given above, the last update time in FIG. 4B is used as the last update time. In another embodiment, the database may be updated using the time, at which the management device updates the database, as the last update time.

When updating the database, the management device 107 checks the difference between the last update time and the database update time and deletes the information elements for which no update is made for a predetermined length of time or longer to keep the information in FIG. 5B up-to-date.

Expression 2 given below may be used to update the database through moving average, where Y(k) is the value of the average received power notified by the k-th control message and Z(i) is the value of the average received power recorded in the database where b is the coefficient ranging from 0 to 1.

$$Z(k+1)=b \times Y(k)+(1-b) \times Y(k) \qquad \text{(Expression 2)}$$

In another embodiment, the database may be updated with Y(k+1) as the simple average value of the average received power values Y(k-m), . . . , Y(k) notified by the control messages for a predetermined period.

In another embodiment, the neighboring base station information on the femto base stations 105*a* is set in the management device 107 as follows. The web server function, if provided in the management device 107, allows a maintenance engineer with the communication earner on a maintenance terminal to access the web server of the management device to set the neighboring base station information on the femto base station. This configuration also allows the user on a PC in a home to access the web server of the management device 107 to set neighboring base station information on the femto base station.

In still another embodiment of the present invention, the neighboring base station information on the femto base station 105*a* is not stored in the management device 107 but may be notified to the macro base stations 103*a*, 103*b*, and so on that are the neighboring base stations of the femto base station 105*a*. More specifically, the femto base station 105*a* notifies the neighboring base station information to the base stations having the IDs of the neighboring base stations whose last update time in FIG. 4B is updated within a predetermined period of time.

Figures 6A, 6B:
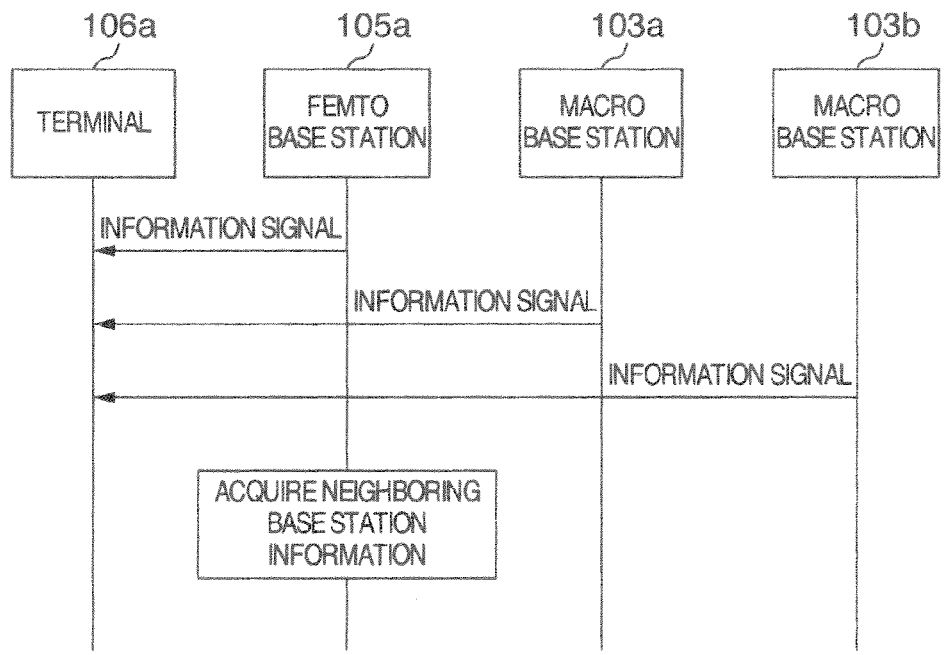
FIG. 6A is a diagram showing the control sequence in which a terminal collects neighboring base station information.
FIG. 6B is a diagram showing the neighboring base station information stored in a terminal.

FIG. 6A is a diagram showing the control sequence in which a terminal collects neighboring base station information. The terminal 106*a* receives the information signal regularly transmitted by the femto base station 105*a* and the macro base stations (103*a*, 103*b*, and so on), which are around the terminal 106*a*, and records the received powers. The average received powers are recorded in the same method as in the method described in FIG. 4A.

FIG. 6B is a diagram showing the neighboring base station information stored in a terminal. The information is basically the same as that described in FIG. 4B except that the received power of the information signal transmitted by the femto base station 105*a* is included.

Figure 7:
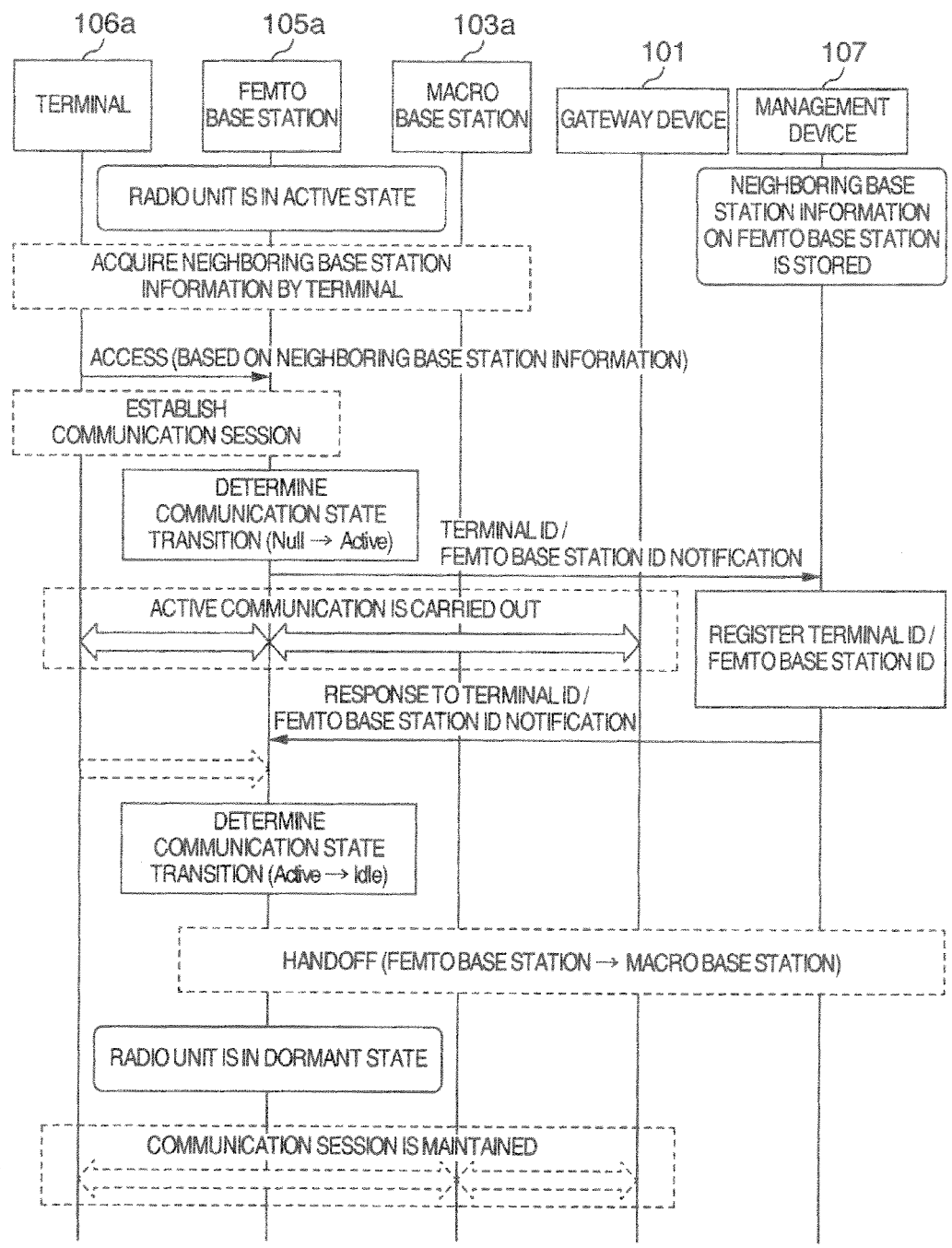
FIG. 7 is a diagram showing the control sequence in which the femto base station in the embodiment of the present invention transits from the radio unit active state to the radio unit dormant state.

FIG. 7 is a diagram showing the control sequence in which the femto base station in the embodiment of the present invention transits from the radio unit active state to the radio unit dormant state. In the description below, it is assumed that the control sequences described in FIG. 4 and FIG. 5 are already performed and that the neighboring base station information on the femto base station 105*a* is already stored in the management device 107. First, the terminal 106*a* acquires the neighboring base station information as described in FIG. 6. If the radio unit of the femto base station 105*a* is in the active state and if the terminal 106*a* receives the highest received power from the femto base station 105*a* among the neighboring base stations, the terminal 106*a* transmits the access control message to the femto base station 105*a* to establish a communication session. This establishes the data communication path between the gateway device 101 and the femto base station 105*a* and the data communication path between the femto base station 105*a* and the terminal 106*a* so that the communication can be carried out. At this time, the femto base station 105*a* recognizes that the terminal communication state has transited from the null state to the active state.

The femto base station 15*a* transmits the terminal ID/femto base station ID notification control message to the management device 107. When the terminal ID/femto base station ID notification is received, the management device 107 stores the correspondence between the terminal ID and the femto base station ID in the database with the last update time timestamp added as shown in FIG. 20. The management device 107 transmits the terminal ID/femto base station ID notification response control message to the femto base station 105*a*.

When the communication session is established, the terminal 106*a* shown in FIG. 1 can communicate with the application server 108 via the gateway device 101. For brevity of description, the application server 108 and the femto base station controller 104*a* are not included in FIG. 7. The communication session and the data communication path may be established according to the procedure of the standard communication method to which the communication system conforms.

During the communication, the femto base station 105*a* checks if the communication state of the terminal will transit from the active state to the idle state. The femto base station 105*a* determines that the communication has transited from the active state to the idle state if the number of packets or the number of data bytes (number of bits) transmitted and received during a predetermined period of time falls below the threshold. If it is determined that the communication has transited from the active state to the idle state, the femto base station 105*a* performs the processing for handing off the terminal 106*a* to the macro base station 103*a*. Note that the femto base station 105*a* received the access control message from the terminal 106*a* at communication initialization time and, from that access control message, acquired the neighboring base station information on the terminal shown in FIG. 6. Because it can be determined from the neighboring base station information on the terminal that the macro base station 103*a* has the highest received power, the femto base station 105*a* can determine that the terminal 106*a* can be handed off to the macro base station 103*a*.

Another embodiment is as follows. By detecting that the terminal communication status has transited from the active state to the idle state, the handoff to a macro base station is determined and, after that, the neighboring base station information is notified by the access control message. However, this neighboring base station information is old because the time has elapsed. To address this problem, a control message is transmitted from the femto base station 105*a* to the terminal 106*a* to instruct that the neighboring base station information shall be transmitted. In response to this control message, the neighboring base station information in the terminal is updated and then the handoff to the macro base station 103*a* is performed.

Figure 8:
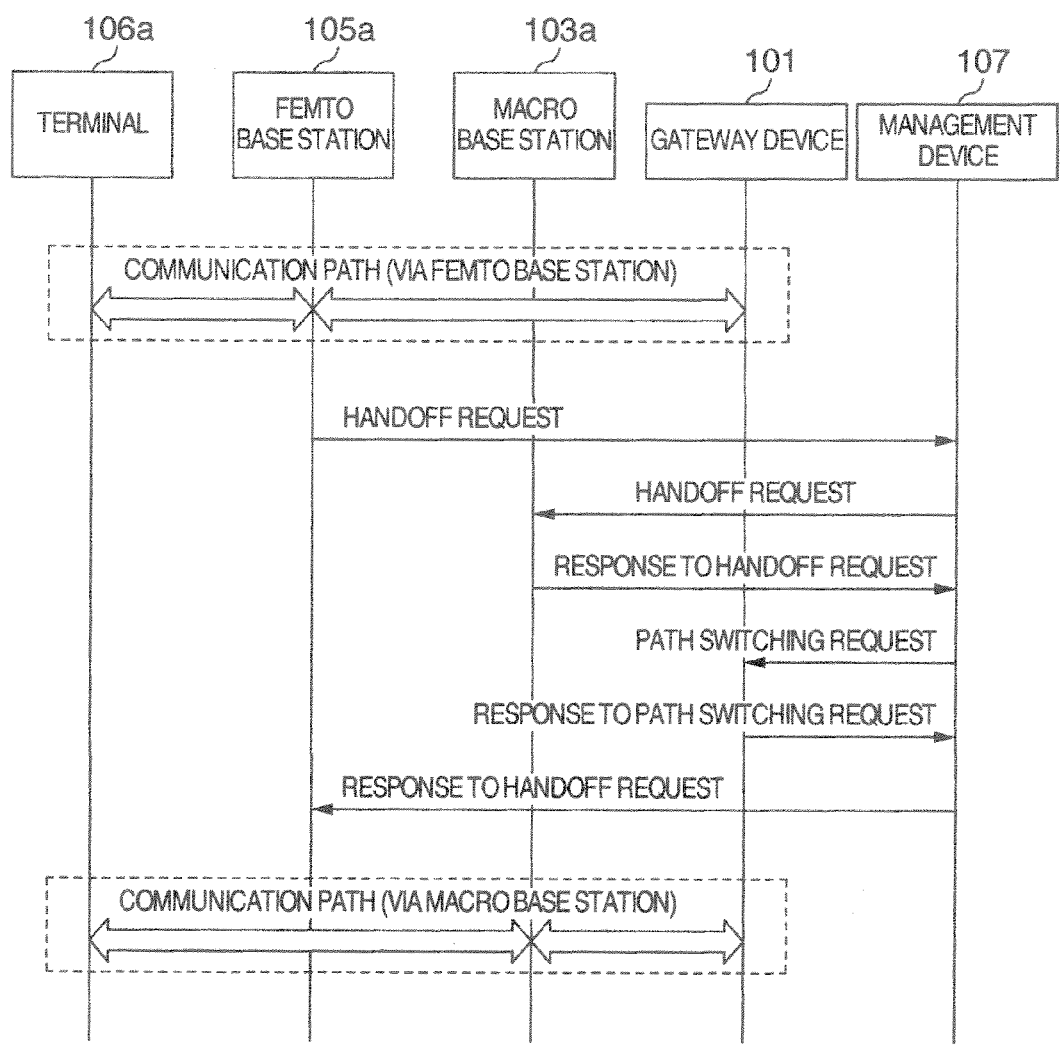
FIG. 8 is a diagram showing the control sequence of handoff from a femto base station to a macro base station.

How to hand off the terminal 106*a* from the femto base station 105*a* to the macro base station 103*a* will be described later with reference to FIG. 8. When the femto base station 105*a* recognizes that the handoff is performed successfully, the radio unit enters the dormant state. The communication session is maintained between the terminal 106*a* and the gateway device 101 via the macro base station 103*a*. FIG. 8 is a diagram showing the control sequence of handoff from a femto base station to a macro base station. The femto base station 105*a* transmits the handoff request control message to the management device 107. This handoff request includes the ID of the macro base station 103*a* that is the handoff destination. The management device 107 notifies the handoff request to the macro base station 103*a* that is the specified handoff destination. When the handoff request is received, the macro base station 103*a* creates the setting for handoff and notifies the handoff request response to the management device 107. The setting for handoff means the specification of the parameters for radio resource reservation and for communication with the terminal 106*a*. When the handoff request response is received, the management device 107 notifies the path switching request control message to the gateway device 101. When the path switching request control message is received, the gateway device 101 switches the path from the path, via which packets have been transferred to and from the femto base station 105*a*, to the path to the macro base station 103*a* and notifies the path switching request response control message to the management device 107. When the path switching request response control message is received, the management device 107 notifies the handoff request response control message to the femto base station 105*a*. The sequence described above allows the communication path to be switched to the path via the macro base station 103*a*.

Another embodiment of handoff is as follows. If the femto base station 105*a* knows, through the means described above, that the terminal may be handed off to the macro base station 103*a*, the femto base station 105*a* does not perform the handoff processing control sequence shown in FIG. 8 but, instead, places the radio unit in the dormant state or stops the transmission of the information signal or extremely decreases the transmission power. In this case, the terminal 106*a* detects that the information signal of the femto base station 105*a* is stopped or extremely weakened and autonomously hands off to the macro base station 103*a*.

It is also possible that the femto base station 105*a* explicitly notifies the handoff request control message to the terminal 106*a* to cause the terminal 106*a* to transmit the handoff request to the macro base station 103*a* Instead of the handoff methods described above, the standard method may also be used to perform the handoff operation.

Figure 9:
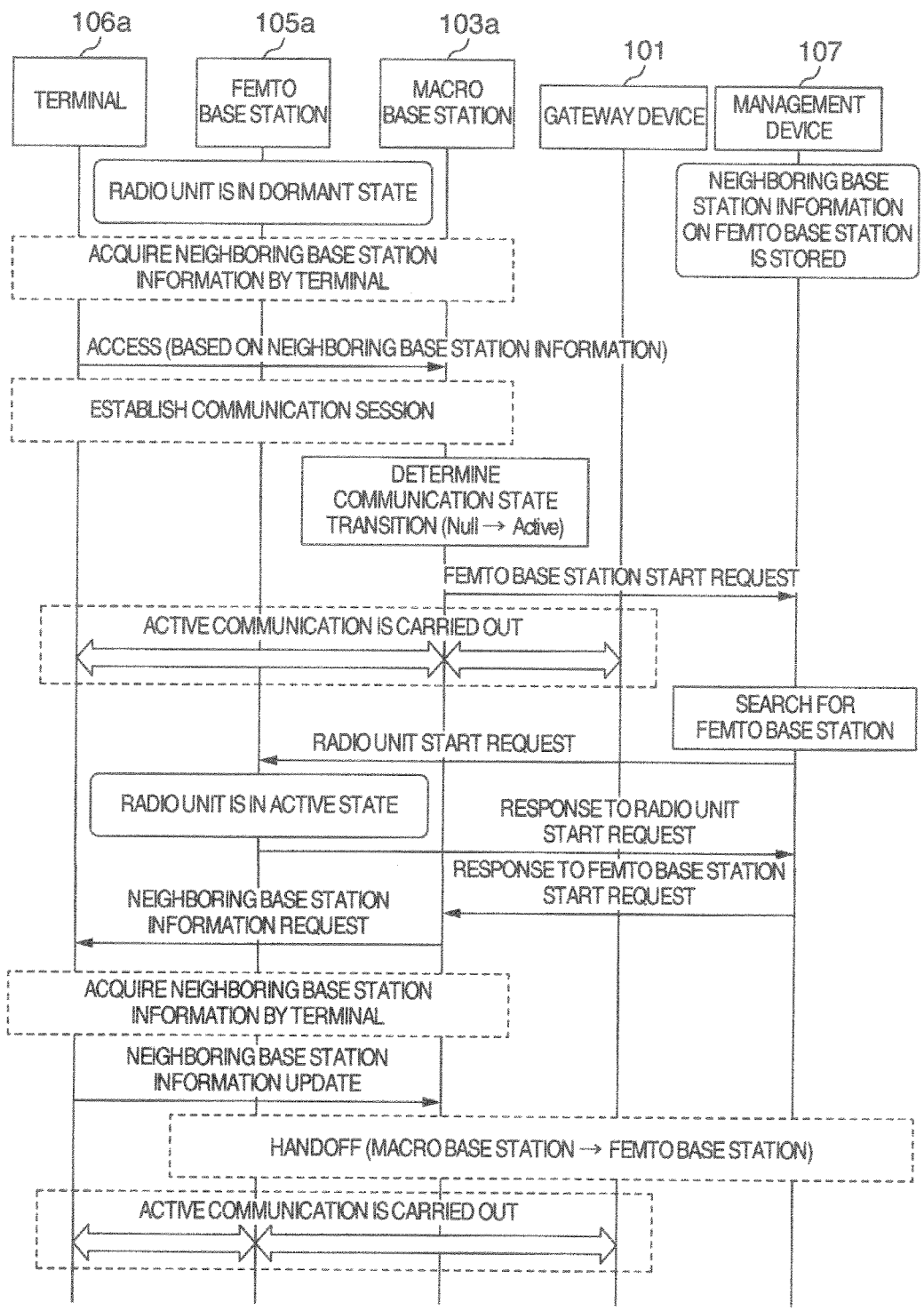
FIG. 9 is a diagram showing the control sequence in which a femto base station transits from the radio unit dormant state to the radio unit active state (while no terminal communication session is performed).

FIG. 9 is a diagram showing the control sequence in which the femto base station transits from the radio unit dormant state to the radio unit active state (while no terminal communication session is performed). It is assumed that the control sequences described in FIG. 6 and FIG. 5 have been performed and that the neighboring base station information on the femto base station 105*a* is already stored in the management device 107. Because the femto base station 105*a* is in the radio unit dormant state, the terminal 106*a* can collect the information only on the macro base stations 103*a*, 103*b*, and so on when collecting the neighboring base station information shown in FIG. 6B. Next, if the average received power of the macro base station 103*a* is the highest among the neighboring base stations of the terminal 106*a*, the terminal 106*a* notifies the access control message to the macro base station 103*a* to establish the communication session. The communication session established in this way allows the data communication path between the gateway device 101 and the macro base station 103*a* and between the macro base station 103*a* and the terminal 106*a* to be established so that the communication can be carried out. At this time, the macro base station 103*a* identifies that the communication state of the terminal has transited from the null state to the active state. Upon detecting that the communication state of the terminal has transited from the null state to the active state, the macro base station 103*a* notifies the femto base station start request control message to the management device 107. The femto base station start request control message is assumed to include the base station ID of the macro base station 103*a* and the terminal ID of the terminal 106*a*. When the femto base station start request control message is received, the management device 107 searches the database, shown in FIG. 5B, using the base station ID of the macro base station 103*a*, from which the control message was received, as the index to detect the items whose neighboring base station ID matches the base station ID used as the index. The management device 107 creates a list of femto base stations of the detected items. The management device 107 creates a list of femto base station IDs of the detected items. At this time, the management device 107 checks the information corresponding to the femto base station ID and the terminal ID registered in the sequence shown in FIG. 7. After that, the management device 107 extracts the femto base station ID corresponding to the terminal ID included in the femto base station start request control message. The management device 107 notifies the radio unit start request control message to all femto base stations having the extracted femto base station ID. When the radio unit start request control message is received, the femto base station 105*a* starts the radio unit if the radio unit is in the dormant state, or keeps the radio unit started if the radio unit is in the active state, and notifies the radio unit start request response control message to the management device 107. When the radio unit start request response control message is received, the management device 107 notifies the femto base station start request response control message to the macro base station 103*a*. When the femto base station start request response control message is received, the macro base station 103*a* notifies the neighboring base station information request control message to the terminal 106*a*. When the neighboring base station information request control message is received, the terminal 106*a* collects the neighboring base station information, shown in FIG. 6, and notifies the collected neighboring base station information to the macro base station 103*a* using the neighboring base station information update control message. In this embodiment, the macro base station 103*a* explicitly issues the neighboring base station information request as a trigger to cause the terminal 106*a* to collect neighboring base station information. In contrast, in a system where the terminal 106*a* periodically transmits the neighboring base station information update control message to the macro base station 103*a*, there may be no need for the macro base station 103*a* to transmit the neighboring base station information request control message. The macro base station 103*a* finds that the updated neighboring base station information includes the femto base station 105*a* and therefore determines that the terminal may be handed off to the femto base station 105*a*.

How to hand off from the macro base station 103*a* to the femto base station 105*a* be described later with reference to FIG. 10. When the neighboring base station information on the femto base station 105*a* is not stored in the management device 107 but is notified to the macro base stations 103*a*, 103*b*, and so on that are the neighboring base stations of the femto base station 105*a* as described in another embodiment described above, the macro base station 103*a* stores the neighboring base station information on the femto base station 105*a*. In this case, the macro base station 103*a* may perform the femto base station search processing that is performed in the management device 107 and, if the corresponding femto base station 105*a* is found, the macro base station 103*a* may notify the radio unit start request control message to the femto base station 105*a*. When the radio unit start request control message is received, the femto base station 105*a* starts the radio unit if the radio unit is dormant, or keeps the radio unit active if the radio unit is started, and notifies the radio unit start request response control message to the macro base station 103*a*. The processing that follows may be implemented in the same sequence as the that in which the macro base station 103*a* notifies the neighboring base station request control message to the terminal 106*a* shown in FIG. 11. In this way, the femto base station search function and the radio unit start request function, which are performed by the management device 107, may be performed by the macro base station 103*a*.

Figure 10:
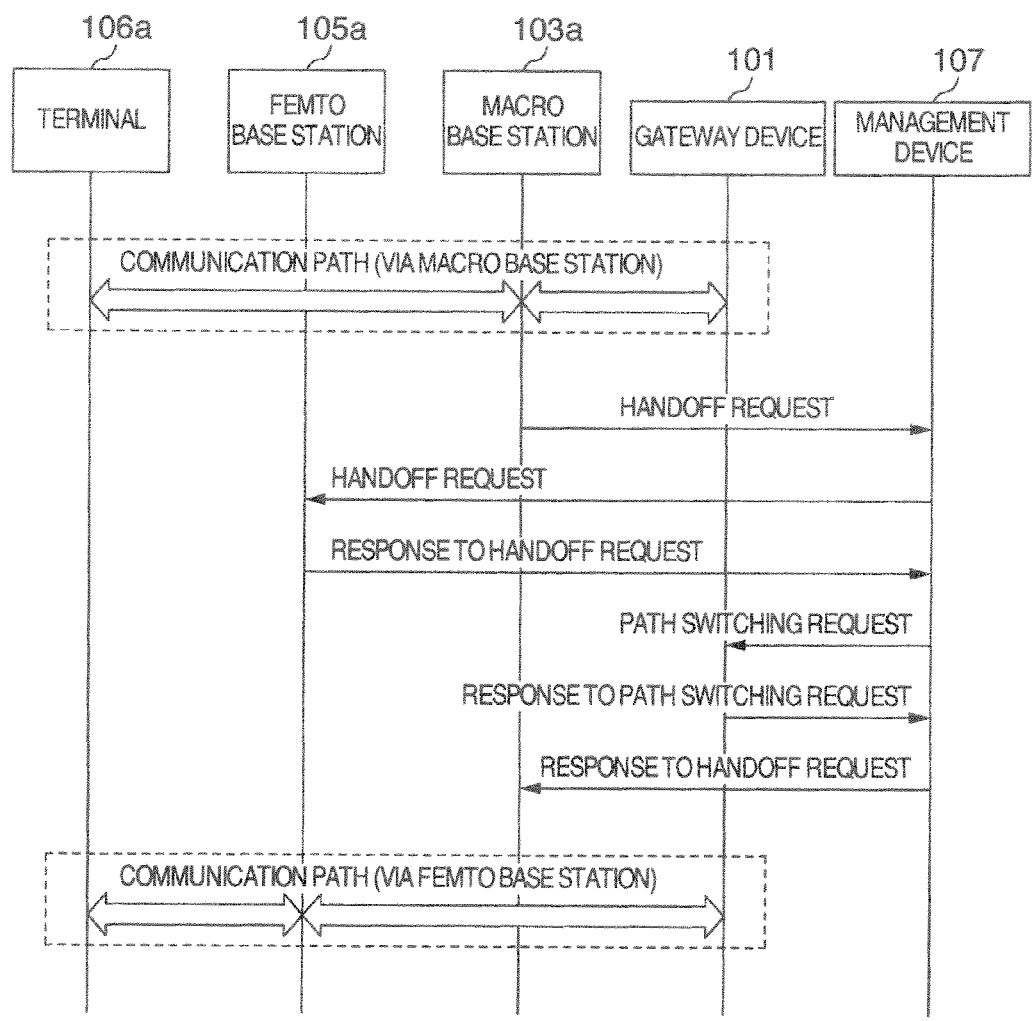
FIG. 10 is a diagram showing the control sequence of handoff from a macro base station to a femto base station.

FIG. 10 is a diagram showing the control sequence of handoff from a macro base station to a femto base station. The macro base station 103*a* transmits the handoff request control message to the management device 107. This handoff request includes the ID of the femto base station 105*a* that is the handoff destination. The management device 107 notifies the handoff request to the femto base station 105*a* that is the specified handoff destination. When the handoff request is received, the ferrite base station 105*a* creates the setting for handoff and notifies the handoff request response to the management device 107. The setting for handoff means the specification of the parameters for radio resource reservation and for communication with the terminal 106*a*. When the handoff request response is received, the management device 107 notifies the path switching request control message to the gateway device 101. When the path switching request control message is received, the gateway device 101 switches the path from the path, via which packets have been transferred to and from the macro base station 103*a*, to the path to the femto base station 105*a* and notifies the path switching request response control message to the management device 107. When the path switching request response control message is received, the management device 107 notifies the handoff request response control message to the macro base station 103*a*. The sequence described above allows the communication path to be switched to the path via the femto base station 105*a*.

Instead of explicitly transmitting the handoff requests from the macro base station 103*a*, the terminal 106*a* may periodically collect the neighboring base station information shown in FIG. 6 and, when a strong received-power of the information signal is received from the femto base station 105*a*, notifies a handoff-trigger control message to the femto base station 105*a* to start the handoff operation. It is also possible that the macro base station 103*a* explicitly notifies the handoff request control message to the terminal 106*a* to cause the terminal 106*a* to transmit the handoff request to the femto base station 105*a*. Instead of the handoff methods described above, the standard method may also be used to perform the handoff operation.

Figure 11:
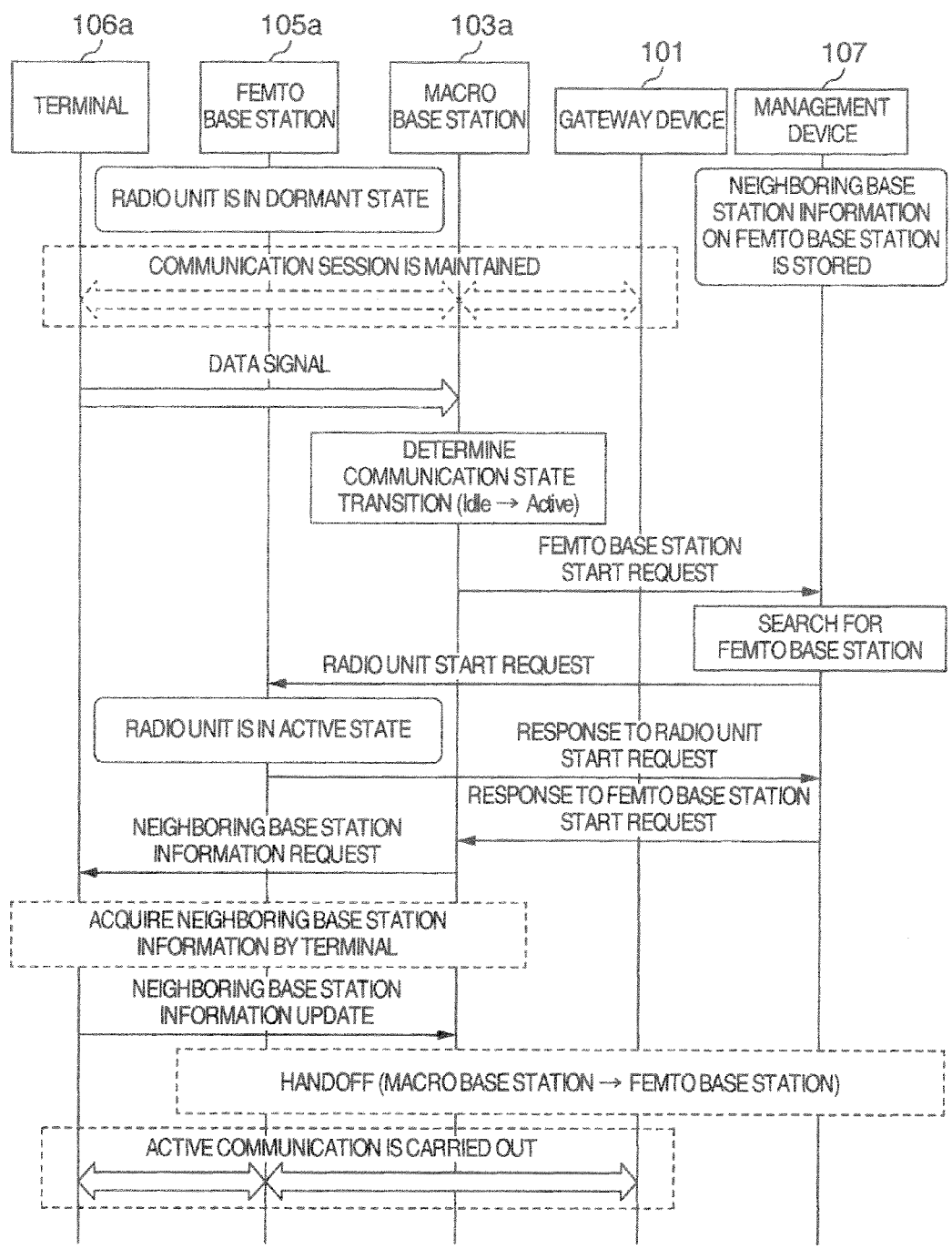
FIG. 11 is a diagram showing the control sequence in which a femto base station transits from the radio unit dormant state to the radio unit active state (while a terminal communication session is performed).

FIG. 11 is a diagram showing the control sequence in which the femto base station transits from the radio unit dormant state to the radio unit active state (while a terminal communication session is performed). It is assumed that the control sequences described in FIG. 6 and FIG. 5 have been performed and that the neighboring base station information on the femto base station 105*a* is already stored in the management device 107. The terminal 106*a* maintains the communication session with the gateway device 101 via the macro base station 103*a*, and the communication state of the terminal is the idle state. The macro base station 103*a* monitors the communication state of the terminal to see if the communication transits from the idle state to the active state. The macro base station 103*a* determines that the communication has transited from the idle state to the active state if the number of transmitted or received packets or the number of data communication bytes (number of bits) for a predetermined period of time exceeds the threshold. It is assumed that the threshold for the number of packets or the number of data communication bytes for maintaining the communication session is a value large enough not to generate an idle-to-active transition detection error. The macro base station 103*a*, which determines that the communication has transited from the idle state to the active state, notifies the femto base station start request control message to the management device 107. The control sequence that follows is the same as that shown in FIG. 9.

Another embodiment of the embodiment described above is as follows. When the neighboring base station information on the femto base station 105*a* is not stored in the management device 107 but is notified to the macro base stations 103*a*, 103*b*, and so on that are the neighboring base stations of the femto base station 105*a*, the femto base station search function and the radio unit start request function, which are performed by the management device 107, may be performed by the macro base station 103*a* as described above.

Figure 12:
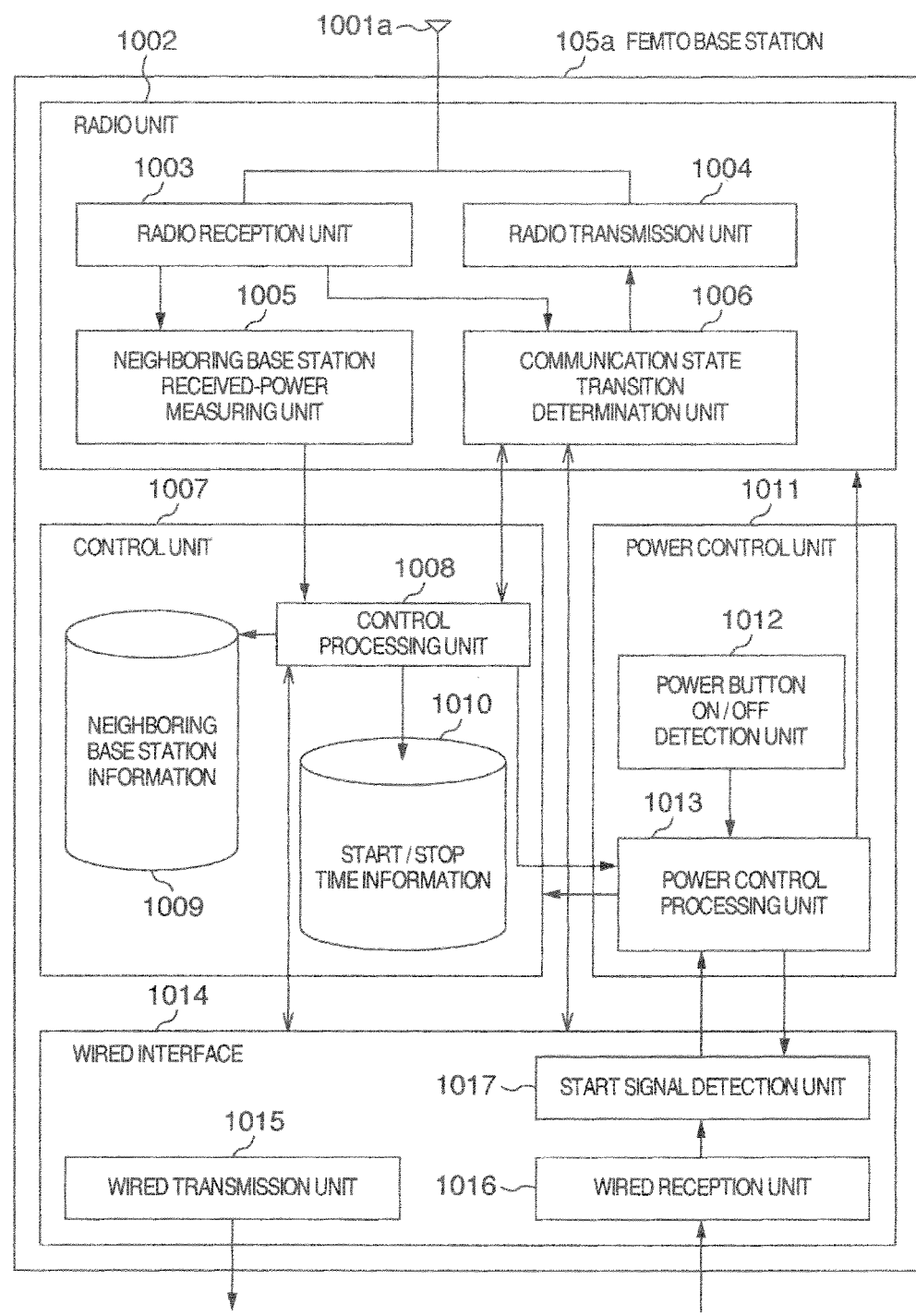
FIG. 12 is a diagram showing the configuration of the femto base station in the embodiment of the embodiment.

FIG. 12 is a diagram showing the configuration of the femto base station in the embodiment of the embodiment. The femto base station includes one or more antennas 1001*a*, a radio unit 1002, a control unit 1007, a wired interface 1014, and a power control unit 1011. The following describes the function of each configuration block. The radio unit 1002 includes a radio reception unit 1003, a radio transmission unit 1004, a neighboring base station received-power measuring unit 1005, and a communication state transition determination unit 1006. The radio reception unit 1003 is a block that performs filtering processing for the signal received from the antenna 1001a and converts the received signal to the analog signal in the baseband. After that, the radio reception unit 1003 converts the analog signal to the digital signal (A/D conversion) and performs the demodulation/decoding processing as the baseband signal processing. The radio transmission unit 1004 is a block that converts the digital signal, encoded and modulated by the baseband signal processing, to the analog signal (D/A conversion), converts the frequency band, amplifies the power, and generates the signal to be transmitted from the antenna 1001a. The neighboring base station received-power measuring unit 1005 functions as the searcher of the neighboring base stations using the output of the radio reception unit 1003 and measures the received power of the neighboring base stations. The communication state transition determination unit 1006 determines if the communication state of the terminal transits from active to idle in the sequence shown in FIG. 7. The detail will be described later with reference to FIG. 13

In the control unit 1007, a control processing unit 1008 performs the processing shown in the control sequences in FIG. 7, FIG. 8, FIG. 9, FIG. 10, and FIG. 11. The databases processed by the control processing unit 1008 include neighboring base station information 1009 and start/stop time information 1010. The neighboring base station information 1009, which contains the data shown in FIG. 4B, is the received-power information measured by the neighboring base station received-power measuring unit 1005 of the radio unit 1002 and recorded by base station ID. The start/stop time information 1010 will be described in detail later with reference to FIG. 16.

When it is detected that no terminal is under control of the femto base station, the control processing unit 1008 transmits a notification to a power control processing unit 1013 and stops the power to place the femto base station in the dormant state. Also when it is detected that one or more terminals are under control of the femto base station but no terminal issues a call for a predetermined time or longer, the control processing unit 1008 transmits a notification to the power control processing unit 1013 and stops the power to place the femto base station in the dormant state. The wired interface 1014 includes a wired transmission unit 1015, a wired reception unit 1016, and a start signal detection unit 1017. The wired transmission unit 1015 and the wired reception unit 1016 may be configured by a communication circuit such as an Ethernet (registered trademark) line communication circuit, an optical line communication circuit, an ADSL line communication circuit, or a power line communications (PLC) communication circuit. If the reception of a special format packet (magic packet) is detected in the output of the wired reception unit 1016, the start signal detection unit 1017 transmits a notification to the power control unit 1011. For example, if the start signal detection unit 1017 detects a UDP datagram immediately after the IP header wherein the UDP datagram is 102 bytes of data composed of 0xffffffffffff (6 bytes) and the 16 consecutive MAC address (6 bytes) of the wired interface 1014, it is determined that the magic packet is detected. The magic packet may have a format other than the one described above if the format is identified by the device. The power control unit 1011 includes a power button on/off detection unit 1012 and the power control processing unit 1013. The power button on/off detection unit 1012 will be described later with reference to FIG. 16. The power control processing unit 1013 turns on and off the power of the radio unit 1002, control unit 1007, and wired interface 1014. When the start signal detection unit 1017 of the wired interface 1014 receives a special packet and detects the start signal that is notified to the power control processing unit 1013, the special packet may have one of the different formats to indicate what unit is to be started; the radio unit 1002 only, power control unit 1011, or wired interface 1014. For example, in the example given above, the first least significant bit of the low-order three bits of 0xffffffffffff (6 bytes) is assigned to the radio unit 1002, the second least significant bit to the control unit 1007, and the third least significant bit to the wired interface 1014. These bits may be set so that the unit is started if the bit is 1 but is not started if the bit is 0. The format is not limited to the one given above but any format may be used if the special packet can be identified by the format. Note that the wired reception unit 1016 and start signal detection unit 1017 are always started in the wired interface 1014. The power control processing unit 1013 may turn on/off the power by a command from the control processing unit 1008 of the control unit 1007 or by an operation via the power button on/off detection unit 1012.

Figure 13A:
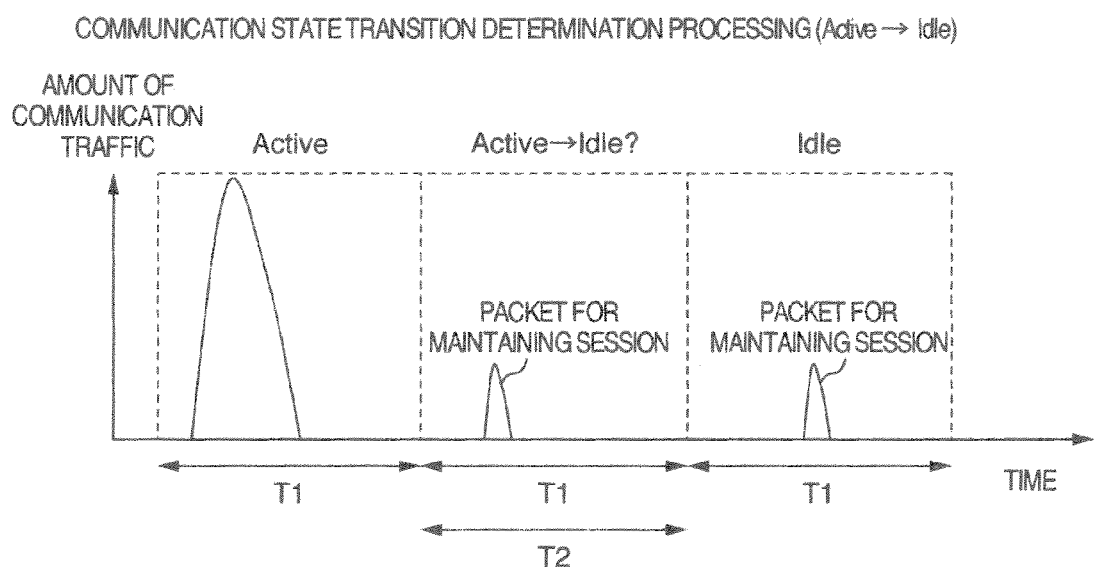
FIG. 13A is a diagram showing the processing for determining if the communication state of a terminal under control of a femto base station or a macro base station transits from active to idle.

FIG. 13A is a diagram showing the processing for determining if the communication state of a terminal under control of a femto base station or a macro base station transits from active to idle. The amount of communication traffic is measured for the predetermined period of time T1, and the communication is determined active if the amount of communication traffic is equal to or larger than the threshold but is determined idle if the predetermined period of time T2 has elapsed after the amount of communication traffic becomes smaller than the threshold. In the FIG. 13A, it is shown that time T1=time T2 as the example.

Figure 13B:
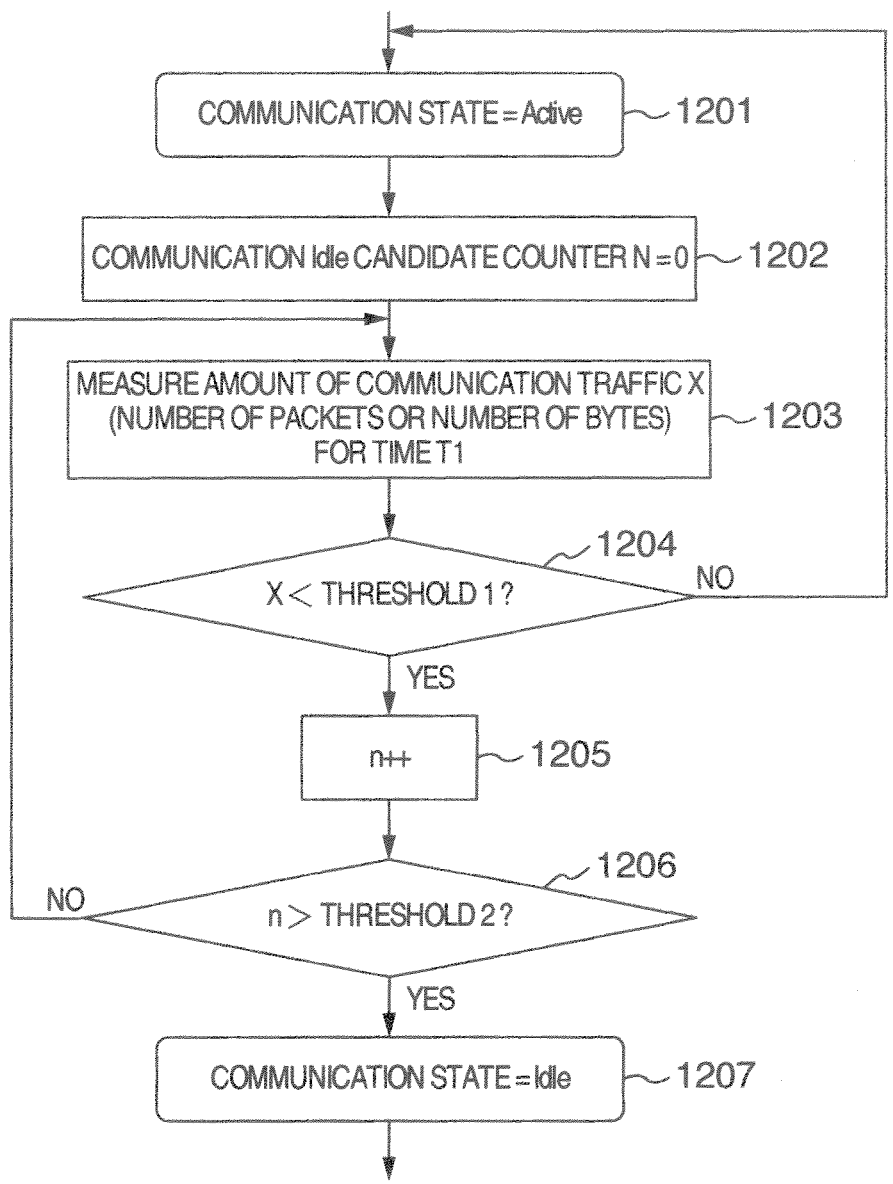
FIG. 13B is a diagram showing the determination algorithm used by the communication state transition determination unit of a femto base station or a macro base station for determining if the terminal communication state transits from active to idle.

FIG. 13B is a diagram showing the determination algorithm used by the communication state transition determination unit of a femto base station or a macro base station to determine if the communication state of a terminal transits from active to idle. First, it is assumed that, at the start of this algorithm, the terminal is in the active communication state (step 1201). The communication state transition determination unit 1006 initializes to zero the communication idle candidate counter n that is incremented after detecting that the terminal communication state may transit from active to idle (step 1202).

Next, the communication state transition determination unit measures the amount of communication traffic X for the time T1 (step 1203). The amount of communication traffic X is the number of packets processed by the communication state transition determination unit 1006, which means the number of packets transmitted and received in the radio area of the femto base station 105a. In another embodiment, the amount of communication traffic X may be the number of transmitted and received bytes or the number of transmitted and received bits. Next, the communication state transition determination unit 1006 determines if the amount of communication traffic X is smaller than the threshold 1 (Thr1) (step 1204). If the amount of communication traffic X is smaller than the threshold 1 (Thr1), control is passed to step 1205; otherwise, control is passed back to step 1201 that is the first step. The value of the communication idle candidate counter n is incremented by 1 (step 1205). The communication state transition determination unit 1006 determines if the value of the communication idle candidate counter n is larger than the threshold 2 (Thr2) (step 1206). If the value of the communication idle candidate counter n is larger than the threshold 2 (Thr2), the communication state transition determination unit 1006 determines that the communication state of the terminal has transited from active to idle (step 1207); otherwise, control is passed back to step 1203.

The algorithm in the example in FIG. 13B, in which the communication idle candidate counter n is used, determines that the communication state of the terminal has transited from active to idle if n*T1>T2. Another algorithm is also possible in which the elapsed time is measured beginning at the time the amount of communication traffic X becomes smaller than the threshold 1 (Thr1) first and, if the elapsed time exceeds T2, it is determined that the communication state of the terminal has transited from active to idle.

Figure 14A:
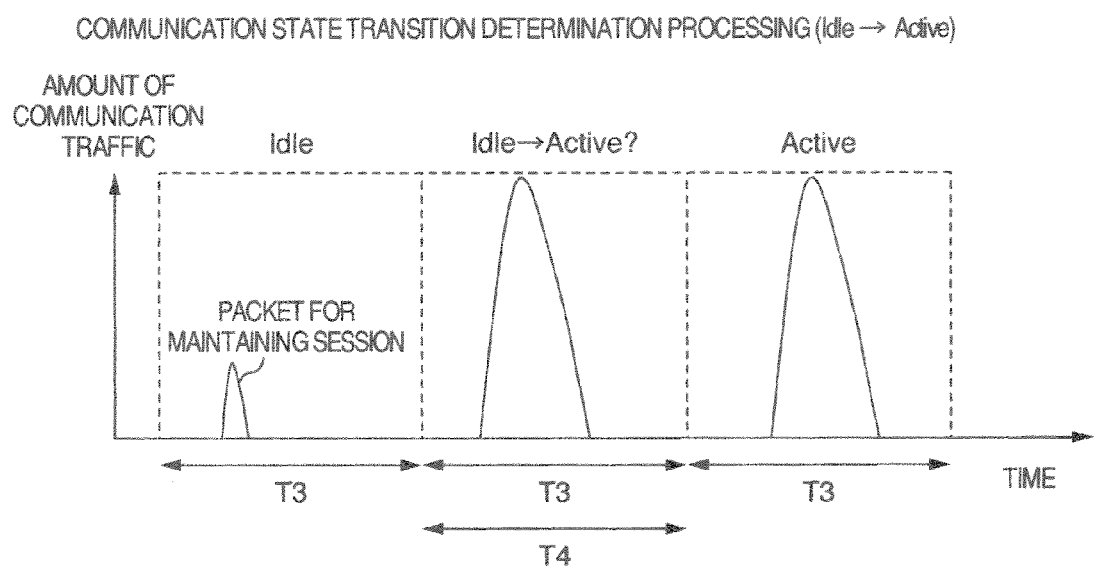
FIG. 14A is a diagram showing the processing for determining if the communication state of a terminal under control of a femto base station or a macro base station transits from idle to active.

FIG. 14A is a diagram showing the processing for determining if the communication state of a terminal under control of a femto base station or a macro base station transits from idle to active. The amount of communication traffic is measured for the predetermined period of time T3, and the communication state is determined idle if the amount of communication traffic is equal to or smaller than the threshold but is determined active if the predetermined period of time T4 has elapsed after the amount of communication traffic becomes larger than the threshold. In the FIG. 14A, it is shown that time T3=time T4 as the example.

Figure 14B:
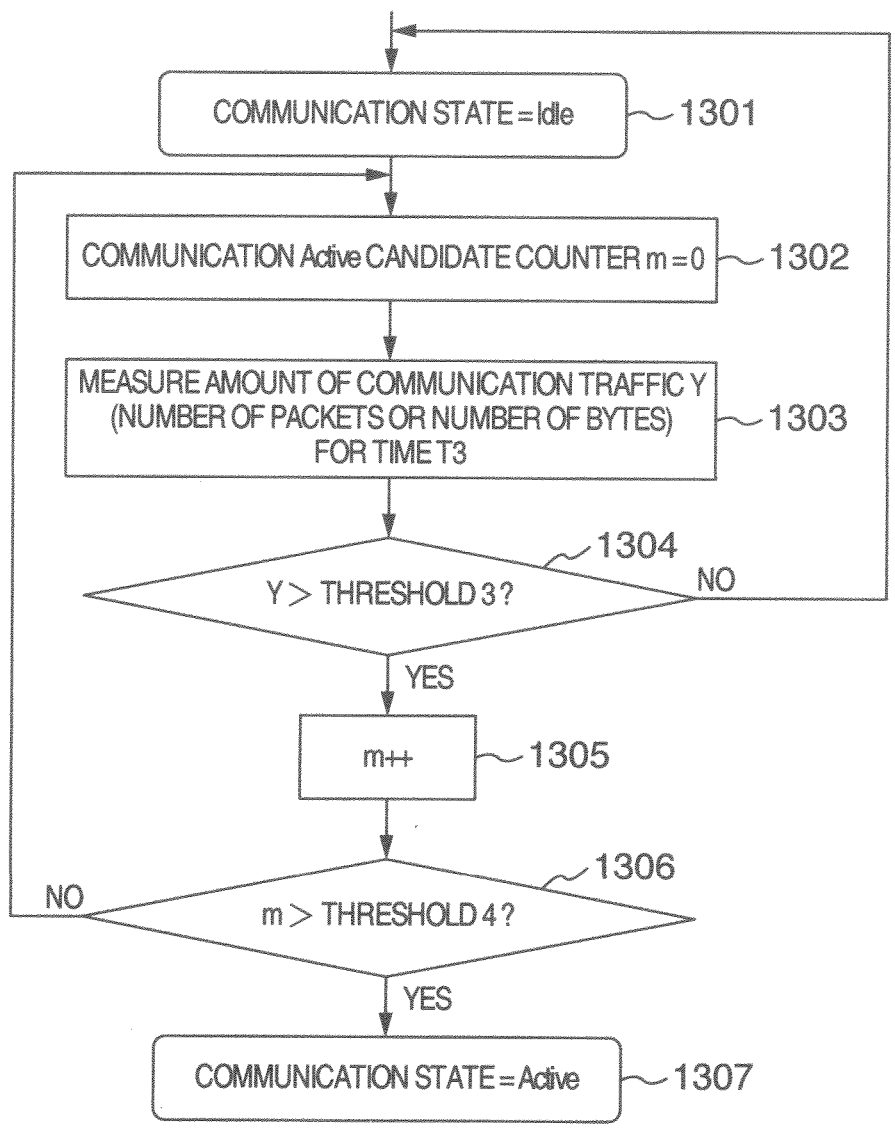
FIG. 14B is a diagram showing the determination algorithm used by the communication state transition determination unit of a femto base station or a macro base station for determining if the terminal communication state transits from idle to active.

FIG. 14B is a diagram showing the determination algorithm used by the communication state transition determination unit of a femto base station or a macro base station to determine if the communication state of a terminal transits from idle to active. First, it is assumed that, at the start of this algorithm, the terminal is in the idle communication state (step 1301). The communication state transition determination unit initializes to zero the communication active candidate counter m that is incremented after detecting that the communication state of the terminal may transit from idle to active (step 1302). Next, the communication state transition determination unit measures the amount of communication traffic Y for the time T3 (step 1303). The amount of communication traffic Y is the number of packets processed by the communication state transition determination unit 1006, which means the number of packets transmitted and received in the radio area of the femto base station 105a. In another embodiment, the amount of communication traffic Y may be the number of transmitted and received bytes or the number of transmitted and received bits. Next, the communication state transition determination unit determines if the amount of communication traffic Y is larger than the threshold 3 (Thr3) (step 1304). If the amount of communication traffic Y is larger than the threshold 3 (Thr3), control is passed to step 1305; otherwise, control is passed back to step 1301 that is the first step. The value of the communication active candidate counter m is incremented by 1 (step 1305). The communication state transition determination unit determines if the value of the communication active candidate counter m is larger than the threshold 4 (Thr4) (step 1306). If the value of the communication active candidate counter m is larger than the threshold 4 (Thr4), the communication state transition determination unit determines that the communication state of the terminal has transited from idle to active (step 1307); otherwise, control is passed back to step 1303. The algorithm in the example in FIG. 14B, in which the communication active candidate counter m is used, determines that the communication state of the terminal has transited from idle to active if m*T3>T4. Another algorithm is also possible in which the elapsed time is measured beginning at the time the amount of communication traffic Y exceeds the threshold 3 (Thr3) first and, if the elapsed time exceeds T4, it is determined that the communication state of the terminal has transited from idle to active.

FIG. 15A is a diagram showing the user interface of the power button on the femto base station in the embodiment of the present invention. A power lamp 1401 is solid green when the power is on blinks green during startup, and is off when the power is off. When the radio unit 1002 is dormant, the color of the lamp may be a different color such as yellow. In addition, when only the wired reception unit 1016 and the start signal detection unit 1017 of the wired interface 1014 are started with no power supplied to the other units, the lamp may go on red or may not display the color. A power ON/OFF button 1403 is a toggle switch that turns on and off the power. The operation performed when this button is pressed depends on a power button setting mode 1402.

FIG. 15B is a diagram showing the power on/off operation performed according to the power button setting mode of the femto base station in the embodiment of the present invention. When the power button setting mode 1402 is set to Always OFF, the power ON/OFF button 1403 is disabled and the entire power is always off. When the power button setting mode 1402 is set to Based on Power ON/OFF button, the power ON/OFF button 1403 works as a toggle switch and the entire device is changed from the power off state to the power on state, or from the power on state to the power off state, each time the power ON/OFF button 1403 is pressed. When the power button setting mode 1402 is set to Based on Start/stop signal, the wired reception unit 1016 and the start signal detection unit 1017 of the wired interface 1014 are always connected electrically to switch the ON/OFF state of the other blocks. In the OFF state, if the above-described magic packet indicating the start signal is detected or the power ON/OFF button 1403 is pressed, the entire device is started and changed to the ON state. In the ON state, if the stop signal indicated by the magic packet is detected or if the power ON/OFF button 1403 is pressed, the power of the wired reception unit 1016 and the start signal detection unit 1017 of the wired interface 1014 is left turned on but the power of the other units is turned off. For example, if the start signal detection unit 1017 detects a UDP datagram immediately after the IP header wherein the UDP datagram is 102 bytes of data composed of 0xffffffffff000 (6 bytes) and the 16 consecutive MAC address (6 bytes) of the wired interface 1014, it is determined that the stop signal is detected. The format of the stop signal is not limited to the one given above but any format may be used if the stop signal can be identified by the device. If there is no stop signal but the start signal is received regularly, the power may be stopped if the start signal is not received for a predetermined period of time. When the power button setting mode 1402 is set to Based on communication state, the wired reception unit 1016 and the start signal detection unit 1017 of the wired interface 1014 are always connected electrically to switch the ON/OFF state of the other blocks. In the OFF state, if the above-described magic packet indicating the start signal is detected or the power ON/OFF button 1403 is pressed, the entire device is started and changed to the ON state. In the ON state, if the femto base station determines that no communication is being carried out or if the power ON/OFF button 1403 is pressed, the wired reception unit 1016 and the start signal detection unit 1017 of the wired interface 1014 are left turned on but the other units are turned off. In this case, the femto base station determines that no communication is being carried out if:

(1) there is no terminal in the area of the femto base station or (2) the communication state of all of one or more terminals in the area of the femto base station is in the null state or has transited from active to idle.

The power button on/off detection unit of the power control unit 1011 of the femto base station 105*a* is a functional block for detecting the operation in which the power ON/OFF button 1403 is pressed, and the power control processing unit 1013 is a functional block for executing the power on/off operation according to the power button setting mode in FIG. 15B as described above.

Figure 16:
FIG. 16 is a diagram showing the start/stop time information on the femto base station in the embodiment of the present invention.

FIG. 16 is a diagram showing the start/stop time information on the femto base station in the embodiment of the present invention. The femto base station arranges the start times and the stop times by date and saves the arranged data as the log. The femto base station arranges this log information by day of week and by stop-time zone, calculates the average of the time differences between a stop time and the next start time, and stores the result as the start/stop time information 1010.

FIG. 17 is a diagram showing the operation of the power control unit 1011 of the femto base station in the embodiment of the present invention. When the power button setting mode 1402 is set to Based on Start/stop signal or Based on communication state in FIG. 15B, the power of only the wired reception unit 1016 and the start signal detection unit 1017 of the wired interface 1014 may always be turned on. Alternatively, using the start/stop time information 1010 shown in FIG. 16, the wired reception unit 1016 and the start signal detection unit 1017 of the wired interface 1014 may be operated in the intermittent reception operation mode. The average times to the next start are already calculated by day of week and by stop time and are stored as the start/stop time information 1010. Therefore, with the halt time of the wired reception unit as T6, the power of the wired reception unit 1016 and the start signal detection unit 1017 are turned off according to the average time T5 to the next start. The period T7, during which the power of the wired reception unit 1016 and the start signal detection unit 1017 is kept on, is determined according to the halt time T6. If the wired reception unit 1016 and the start signal detection unit 1017 are not started even after T7, the power of the wired reception unit 1016 and the start signal detection unit 1017 is turned off again. By referencing the stop time at which the power is turned off in this way, the operation is repeated in which the average time T5 to the next start by day of week and by stop time is referenced in the start/stop time information 1010 to determine the halt time T6.

The halt time T6 and the start time T7 may also be determined by day of week irrespective of the average value T5 from the stop to the start. For example, the operation may be performed in such a way that the power is on from 18:00 to 24:00 and off during the rest of the day on week days and that the power is on from 9:00 to 24:00 on holidays.

In another embodiment in which the power button setting mode 1402 is set to Based on Start/stop signal or Based on communication state, the power of the wired reception unit 1016 and the start signal detection unit 1017 are turned off during a predetermined period of time T9 if the signal is not detected for a predetermined period of time T8 after the wired reception unit received the signal last and, after the time T9 has elapsed, the power of the wired reception unit 1016 and the start signal detection unit 1017 is turned on again.

Figure 18:
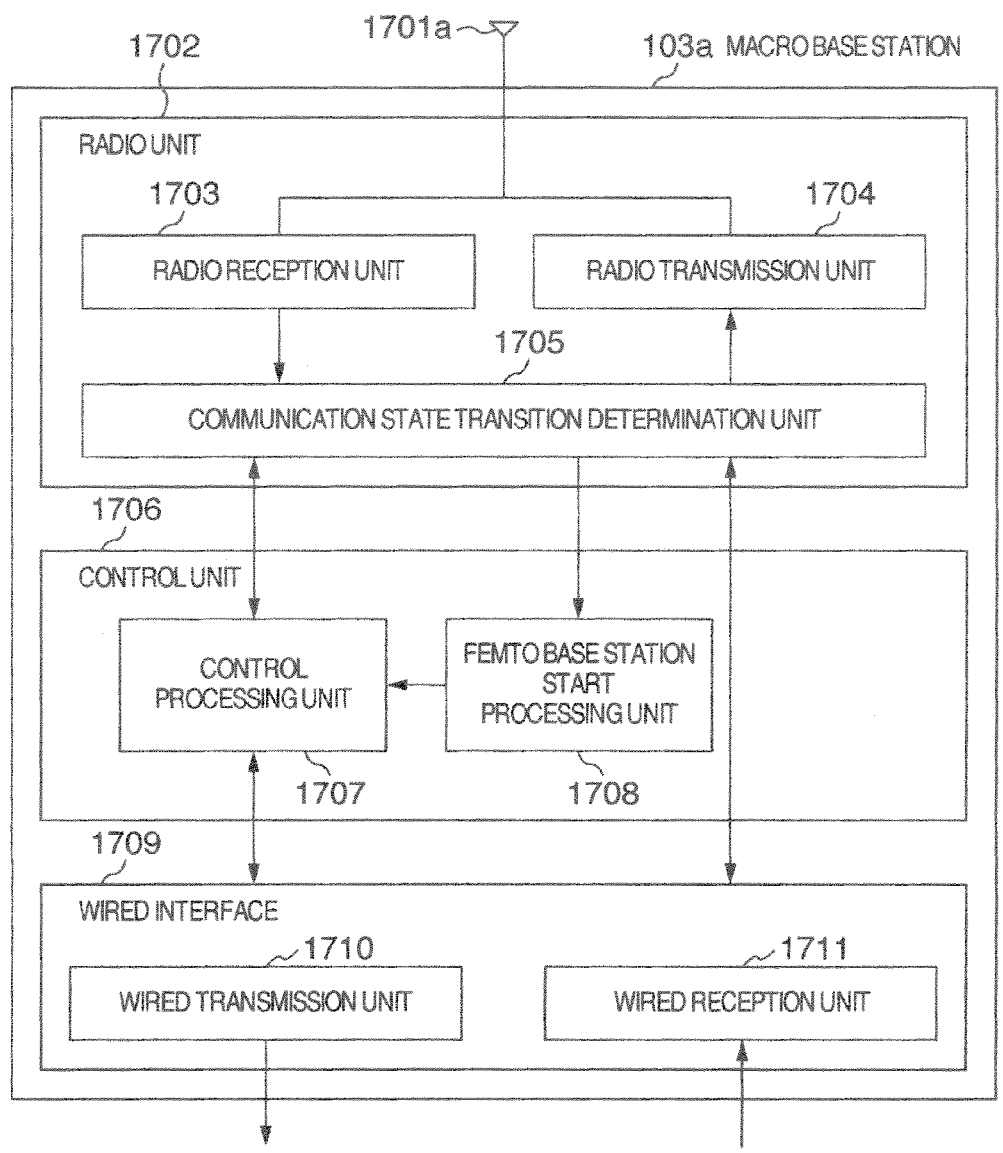
FIG. 18 is a diagram showing the configuration of the macro base station in the embodiment of the present invention.

FIG. 18 is a diagram showing the configuration of the macro base station in the embodiment of the present invention.

The macro base station includes one or more antennas 1701*a*, a radio unit 1702, a control unit 1706, and a wired interface 1709. The following describes the function of each configuration block. The radio unit 1702 includes a radio reception unit 1703, a radio transmission unit 1704, and a communication state determination unit 1705. The radio reception unit 1703 has the same function as that of the radio reception unit 1003 of the femto base station 105*a*. Although the radio reception unit 1703 has higher performance and more resources than that of the femto base station because of the difference in the number of users that are accommodated, the function is equivalent. The radio transmission unit 1704 has the same function as that of the radio transmission unit 1004 of the femto base station 105*a*. The communication state determination unit 1705 has the same function as that of the communication state determination unit 1006 of the femto base station 105*a*. The control unit 1706 includes a control processing unit 1707 and a femto base station start processing unit 1708. The control processing unit 1707 transmits and receives the protocol control messages in the control sequence described above. When the communication state of a terminal transits from null to active or from idle to active, the communication state determination unit 1006 transmits an event generation notification to the femto base station start processing unit 1708. The femto base station start processing unit 1708 transmits the femto base station start request control message to the management device 107 via the control processing unit 1707. The wired interface 1709 includes a wired transmission unit 1710 and a wired reception unit 1711. The wired interface 1709, which is a communication circuit for wired communication with the macro base station controller 102*a* or the gateway device 101, carries out communication for an Ethernet line, an optical line, or a leased line.

Figure 19:
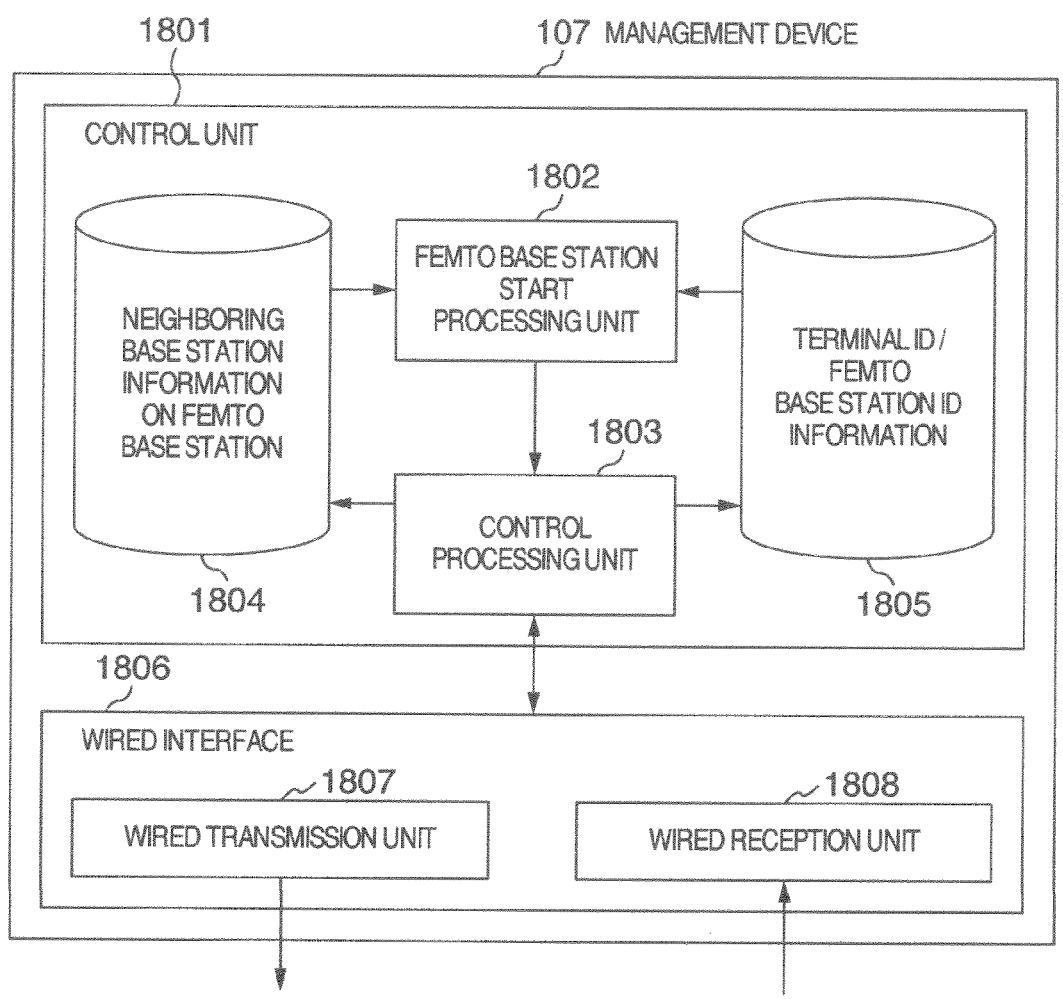
FIG. 19 is a diagram showing the configuration of the manage ent device in the embodiment of the present invention.

FIG. 19 is a diagram showing the configuration of the management device in the embodiment of the present invention. The management device 107 includes a control unit 1801 and a wired interface 1806. The control unit 1801 includes a femto base station start processing unit 1802 and a control processing unit 1803 and has the databases of femto base station/neighboring base station information 1804 and terminal ID/femto base station ID information 1805. The wired interface 1806 includes a wired transmission unit 1807 and a wired reception unit 1808. The wired interface 1806, which is a communication circuit for wired communication with the other devices, carries out communication for an Ethernet line, an optical line, or a leased line. When the femto base station start request control message is received from the macro base station 103*a*, the management device 107 receives it by the femto base station start processing unit 1802. Using the macro base station ID in the control message as the index, the femto base station start processing unit 1802 searches the femto base station/neighboring base station information 1804 for items each having the corresponding neighboring station ID and creates a list of femto base station IDs of the items that have been detected. After that, the femto base station start processing unit 1802 extracts the femto base station ID corresponding to the terminal ID included in the femto base station start request control message. The femto base station start processing unit 1802 notifies the radio unit start request control message to all femto base stations, which have the extracted femto base station ID, via the control processing unit 1803.

FIG. 20 is a diagram showing the terminal ID/femto base station ID information stored in the management device in the embodiment of the present invention. As shown in the sequence in FIG. 7, this information is the information registered in the management device 107 when communication between a terminal and the femto base station is established. The last update time is included in the information so that data, which has not been updated for a predetermined period, can be deleted to keep the data up to date. This last update time may be checked either regularly or when the management device 107 receives a femto base station start request from the macro base station 103a.

Another embodiment of the present invention may also be implemented by providing the function of the femto base station start processing unit 1802 of the management device, as well as the databases of the femto base station neighboring base station information 1804 and the terminal ID/femto base station ID information 1805, in a macro base station.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A radio communication system comprising:
at least one first base station;
a second base station that is in a radio wave reachable range of the at least one first base station and has a radio wave reachable range shorter than the radio wave reachable range of the at least one first base station: and
a management device configured to manage the at least one first base station and the second base station,
wherein the second base station comprises:
a radio transmission unit;
a radio reception unit;
a measuring unit configured to measure a received power of the at least one first base station;
a storing unit configured to store a result of the measured received power of the at least one first base station as neighboring base station information; and
a notifying unit configured to notify the neighboring base station information to the management device;
wherein the second base station further comprises:
a determining unit of the second base station configured to determine a state of a terminal of one or more terminals based on an amount of communication with the second base station; and
a handing-off unit configured to select the at least one first base station to be handed off based on the neighboring base station information and to transmit a hand off request including an identification of the at least one first base station to the management device when the determining unit determines that the state of the terminal in communication is an idle state,
wherein after handing off a communication session of the terminal having the idle state to the at least one first base station, the radio transmission unit and the radio reception unit are in a stopping state.

2. The radio communication system according to claim 1, wherein
the at least one first base station comprises:
a determining unit of the at least one first base station configured to determine a state of the terminal based on an amount of communication of the terminal handed off from the second base station; and
a transmitting unit configured to transmit a start signal configured to start the second base station, including the identification of the at least one first base station and an ID of the terminal, to the management device when the determining unit detects that the state of the terminal handed off from the second base station is transited from an idle state to an active state;

wherein the management device comprises:
a receiving unit configured to receive the start signal configured to start the second base station from the at least one first base station;
an identification unit configured to identify the second base station to which the start signal is transmitted, based on the neighboring base station information; and
a transmitting unit configured to transmit the start signal to the identified second base station.

3. The radio communication system according to claim 2, wherein the second base station further comprises a wired reception unit configured to receive a message having a predetermined format transmitted from the management device, and the wired reception unit is started even when the radio transmission unit and the radio reception unit are in the stopping state, and the wired reception unit is configured to start the radio transmission unit and the radio reception unit which are in the stopping state; and
wherein the at least one first base station is configured to transmit, to the management device, the hand off request for handing off the communication session for the terminal; and
wherein the second base station is configured to communicate with the terminal again.

4. The radio communication system according to claim 1, wherein
the radio communication system comprises a plurality of the first base stations; and
the second base station is configured to select one of the plurality of the first base stations as having a highest received power in the second base station.

5. The radio communication system according to claim 1, wherein
when, after the second base station detects that there are the one or more terminals in the radio wave reachable range of the second base station, no terminal is configured to issue a call for a predetermined period of time or longer, and
the second base station is configured to make the radio transmission unit and the radio reception unit be in the stopping state.

6. The radio communication system according to claim 1, wherein
the at least one first base station and second base station are connected to the management device using a gateway; and
after the hand off request is issued from the second base station and a path switching request is issued from the management device to a gateway device, the communication session is handed off from the second base station to the at least one first base station.

7. A femto base station that is in a first radio wave reachable range of a macro base station of a plurality of macro base stations and has a second radio wave reachable range shorter than the first radio wave reachable range, and the femto base station and the macro base station are connected to a management device, comprising:
a radio transmission unit;
a radio reception unit;
a measuring unit configured to measure a received power of the macro base station;
a storing unit configured to store a result of the measured received power of the macro base station as neighboring base station information;
a notifying unit configured to notify the neighboring base station information to the management device;

a determining unit configured to determine a state of a terminal of one or more terminals based on an amount of communication of the terminal in communication with the femto base station; and a handing-off unit configured to select a first base station to be handed off based on the neighboring base station information and to transmit a hand off request including an identification of the first base station to the management device when the determining unit determines that a state of the terminal in communication is an idle state, wherein after handing off a communication session of the terminal having the idle state to the first base station, the radio transmission unit and the radio reception unit are in a stopping state.

8. The femto base station according to claim 7, wherein after handing off the communication session to the macro base station, the femto base station is configured not to perform radio transmission/reception to and from the terminal.

9. The femto base station according to claim 7, further comprising a wired reception unit configured to receive a message having a predetermined format transmitted from the management device;

wherein the wired reception unit is started even when the radio transmission unit and the radio reception unit are in the stopping state, and the wired reception unit is configured to start the radio transmission unit and the radio reception unit which are in the stopping state; and wherein, after the communication session for the terminal is handed off from the macro base station, the femto base station is configured to communicate with the terminal again.

10. The femto base station according to claim 7, wherein the femto base station is configured to select the macro base station which has a highest received power of the plurality of the macro base stations.

11. The femto base station according to claim 7, wherein when, after detecting that there are the one or more terminals in the radio wave reachable range of the femto base station, no terminal is configured to issue a call for a predetermined period of time or longer, and the femto base station is configured to make the radio transmission unit and the radio reception unit be in the stopping state.

12. The femto base station according to claim 11, wherein the femto base station further comprises a wired interface; and when the supply of power to the radio unit is stopped, power is supplied to a start signal detection unit included in the wired interface for detecting a start signal supplied from an external source; and when the start signal detection unit detects the start signal from the external source, the supply of power to the radio unit and the wired interface is resumed.

13. The femto base station according to claim 7, wherein the macro base station and the femto base station are connected to the management device using a gateway; and after the hand off request is issued and a path switching request is issued from the management device to the gateway device, the communication session is handed off from the femto base station to the macro base station.

* * * * *